Feb. 22, 1966      D. RUBENSTEIN      3,236,015
SYSTEM OF FABRICATION OF POROUS STRUCTURAL ELEMENTS
Filed July 11, 1961      8 Sheets-Sheet 1
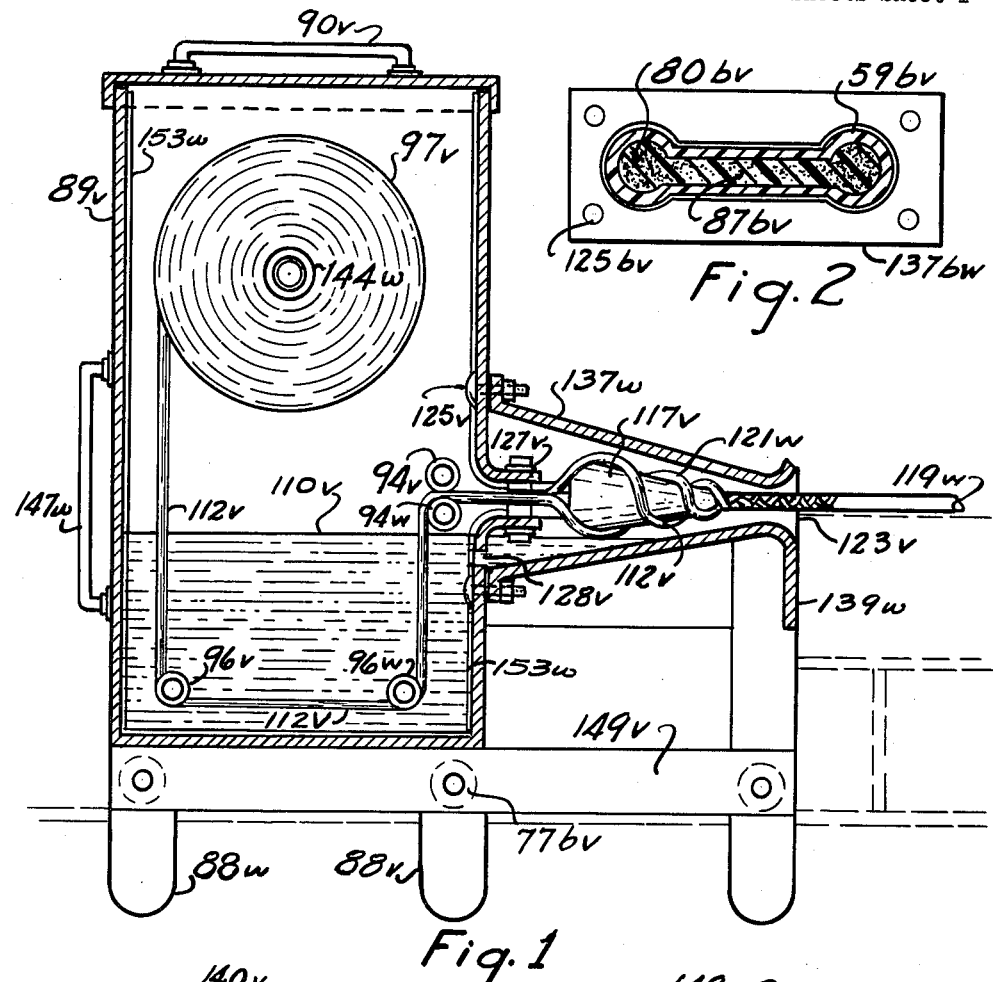
Fig. 2
Fig. 1
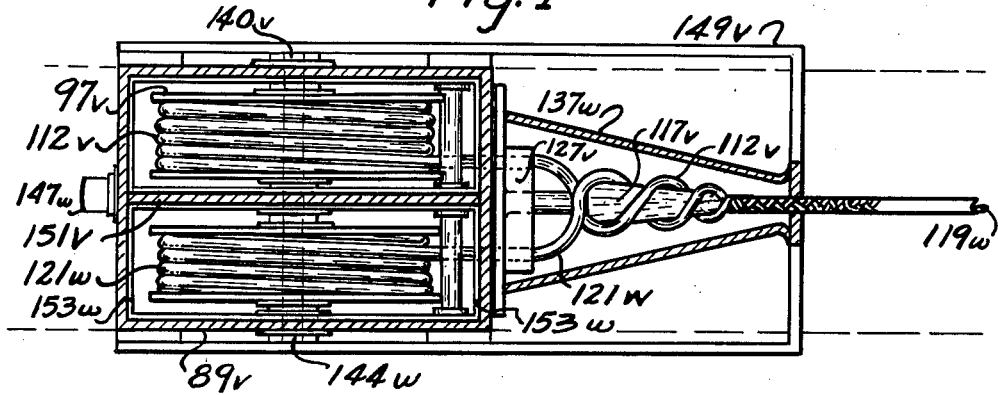
Fig. 3
INVENTOR.
BY David Rubenstein INVENTOR.
BY David Rubenstein Feb. 22, 1966 D. RUBENSTEIN 3,236,015
SYSTEM OF FABRICATION OF POROUS STRUCTURAL ELEMENTS
Filed July 11, 1961 8 Sheets-Sheet 3

INVENTOR.
BY David Rubenstein

Feb. 22, 1966 D. RUBENSTEIN 3,236,015
SYSTEM OF FABRICATION OF POROUS STRUCTURAL ELEMENTS
Filed July 11, 1961 8 Sheets-Sheet 4

INVENTOR.
BY David Rubenstein

Feb. 22, 1966    D. RUBENSTEIN    3,236,015
SYSTEM OF FABRICATION OF POROUS STRUCTURAL ELEMENTS
Filed July 11, 1961    8 Sheets-Sheet 5

INVENTOR.
BY David Rubenstein

Feb. 22, 1966 D. RUBENSTEIN 3,236,015
SYSTEM OF FABRICATION OF POROUS STRUCTURAL ELEMENTS
Filed July 11, 1961 8 Sheets-Sheet 6

INVENTOR.
BY David Rubenstein

INVENTOR.
BY David Rubenstein

Feb. 22, 1966    D. RUBENSTEIN    3,236,015
SYSTEM OF FABRICATION OF POROUS STRUCTURAL ELEMENTS
Filed July 11, 1961    8 Sheets-Sheet 8

INVENTOR.
BY David Rubenstein

United States Patent Office 3,236,015
Patented Feb. 22, 1966

3,236,015
SYSTEM OF FABRICATION OF POROUS
STRUCTURAL ELEMENTS
David Rubenstein, 2750 2nd Ave., San Diego 3, Calif.
Filed July 11, 1961, Ser. No. 126,427
9 Claims. (Cl. 52—309)

This application is a continuation-in-part of application Serial No. 345,084, filed March 27, 1953, and application Serial No. 542,658, filed October 25, 1955, both of which are now abandoned as to their specifications but not as to the inventions disclosed and claimed therein.

This invention relates to a system of fabrication of porous structural elements having a stone-like body, ceramic body, masonry concrete body, clay product body, or other porous structural material body, or cellular material body having the properties of structure adapted to combination with the improved materials of joinery of this invention.

An object of this invention is to provide improved yieldable and shock resistant connections or joints specifically adapted for securing preformed masonry and concrete elements or members to footings, foundations, bases, supports or the like, or to like elements or members and themselves.

Another object of this invention is to provide methods and apparatus useful in making the products of this invention.

A still further object of this invention is to carry forward and apply the advantageous principles set forth in my prior filed applications Serial No. 210,803, filed February 14, 1951; Serial No. 211,011, filed February 15, 1951; Serial No. 211,705, filed February 19, 1951; which applications are now abandoned as to their specifications but are not abandoned as to their disclosed inventions therein, portions of said concept of invention being disclosed and claimed in subsequent applications and in this application for patent.

In my prior applications of record, and in my Patents No. 2,671,158, No. 2,805,448, No. 2,850,890, No. 2,950,-576, No. 2,951,001, and No. 2,951,006, I disclose and claim a plurality of improvements and structure in decorative-structural and structural embodiments. In some of these prior dicslosures of record I disclose features of the instant invention but because of divisional requirements in accord with the Rules of Practice before the Comissioner of Patents, these prior disclosures and clarifying dicslosures are made and claimed herein.

This invention provides materials and methods of using the same and apparatus for the same which provides composite structure having properties directed to improvements in the body structure of porous structural materials and particularly to improved materials and methods of using the same providing joinery of such porous structural materials.

The joinery of this invention, in and of itself, is a structural load bearing material used not only to connect elements or bodies or blocks, e.g., concrete blocks one to the other, but is joinery useful in one or more strengths of tension, compression, shear and torsion, and which, at the same time the joinery constructions have the properties of relieving stresses imposed by impact-impulse shock loadings and absorbing dynamic loadings converting such loadings in a change of state of energy, as e.g., from dynamic moving energy to heat by the medium of impedance and change of wave length of dynamic forces.

The joinery is considered as an integrated load bearing structural body in and of itself as opposed to conventional mortar, mastics, and masonry connections. It performs functional uses not "passive" in character. If it is squeezed by sudden pressures it resists resiliently and returns to reasonable original state while it performs its positive functional use of supporting loads. It is multipurpose, providing where required any one or all of the following fine purposeful uses, namely, waterproof connections, energy dissipating connections, load transfer connections and at the same time it reinforces the material such as concrete, clay products or other porous structural materials, whether of stone-like cellular or plastic character or inorganic or organic material, or both in combination, which can be entered into for discrete or substantial distances adjacent to the joint through penetration and permeation of at least a portion of the joined materials. In addition, the system of fabrication of such porous structural elements is accomplished in a fraction of the time it takes to lay mortar joints as for example in laying up brick or concrete blocks, or other laterally and vertically masonry joined structures.

In my prior applications and patents of issue I disclose and claim joinery used in the erection of concrete blocks, panels, beams, columns, precast pieces, whether of plain concrete, lightweight-concrete, or other porous structural material, reinforced or pre-stressed reinforced by conventional reinforcing means, which provides high strength joinery in the matter or seconds or minutes as in contrast to the laborious means employed in joinery of masonry, etc., by means of cementitious mortar comprised of e.g., Portland cement, sand and water, and with or without lime or other "slip" providing materials.

I have found that the materials used which comprise polymeric resin compositions, rubbers, synthetic rubbers, elastomerics of both thermosetting and thermosetting-thermoplastic compositions, and thermoplastic compositions, require apparatus and methods in their use particularly adapted to economical and practical low cost procedures involved in making the products of these inventions. In the improved structure afforded by these inventions the use of fibrous materials requires means directed to insuring the primary strength of the very high order found e.g., in glass-fibers, or polyethylene terephthalate, or acrylic fibers, etc., be protected against damage before their final end use. In addition, the nature of polymeric resins, rubbers, both natural and synthetic, and elastomeric materials include features such that only by carefully produced end product is the material used useful in an engineering and structurally useful manner. In particular, in masonry constructions, or in fact any porous structural construction, integrity of joinery is vital to its successful use.

Chemical formulations require specialized "know-how" and in this application methods and apparatus previously disclosed but not claimed in prior applications as e.g., my Serial No. 345,084, filed March 27, 1953; Serial No. 498,715, filed April 1, 1955, now Patent No. 3,145,502; Serial No. 558,734, filed January 12, 1956 and now abandoned, and in particular, Serial No. 542,658, filed October 25, 1955, are again disclosed and are claimed herein. For the purposes of disclosure in detail, the parent application Serial No. 542,658, filed October 25, 1955, is referred to as though herein transcribed and is considered as basic disclosure to the instant application.

These disclosures together with various ancillary objects and features of the invention which will later become apparent as the following description proceeds, are attained by the present invention, preferred embodiments of which have been illustrated, by way of example only and not in any way considered as limiting the features of the invention, in the accompanying drawings, wherein:

FIGURE 1 is a vertical sectional view of a joinery making apparatus originally disclosed in my Serial No. 542,658, filed October 25, 1955 as FIGURE 14;

FIGURE 2 is a sectional view of a sizing orifice and product comprising a prepared joinery element;

FIGURE 3 is a plan view of an apparatus similar to FIGURE 1 showing means to utilize two component resin systems;

FIGURE 8 is a spool for use in the apparatus of FIGURE 7 providing a flat section joinery means;

Figure 14:
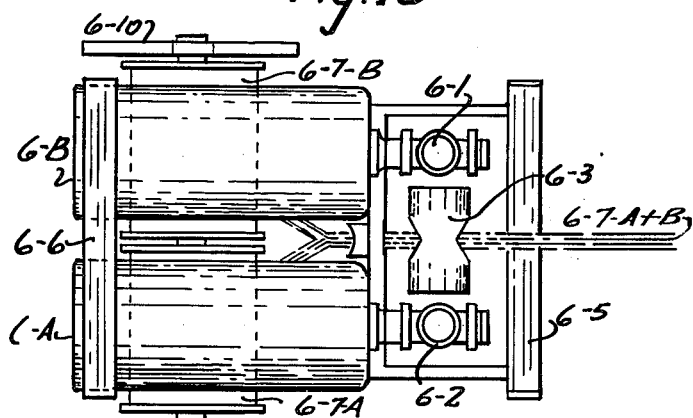
FIGURE 14 is a plan view of a packaging means for a two component polymeric resin composition system and a mixing dispensing means for fiber component.

As shown in FIGURE 14 of the parent application Serial No. 542,658, the general assembly of an exampled construction is shown in which the method of construction is apparent. Upon a level foundation of, e.g., poured concrete, a course of porous structural elements, e.g., concrete block, or brick, or precast elements, panels or composite plastic filled units or panels, metal panels which may or may not be filled with insulation or other functional materials, glass-fiber reinforced polymeric resin panels or elements, foam filled panels such as polyurethane resin foamed structures, vinyl panels, polyvinyl chloride constructions, silicone resin constructions, epoxy resin constructions, polyester resin constructions, and any other adaptable and useful material provided as an element of structure is aligned and set upon a layer of joinery material of the invention and leveled to a true plane in accordance with the designed use.

As each course or sectional panel is placed, a layer of reinforced fibrous plastic material comprising the joinery material is pulled from the apparatus and applied to the vertical joint and to the horizontal joint between the elements. In the case of the horizontal joinery made continuous along a wall comprised of a plurality of elements, e.g., concrete blocks, such joinery acts not only as a bonded connecting layer used in place of cement mortar, but also by the incorporated fiber, e.g., glass fiber strands, rovings, tapes, ropes, or uni-directional fibers alone or unidirectional fibers having cross-fibers of multi-directional fibers embedded in a mass of polymeric resin composition or the other polymeric and plastic materials disclosed in my prior applications and patents of record, acts as a load bearing member of the composite construction. In all examples of the preferred constructions tested in accordance with A.S.T.M. testing procedures, concrete block elements failed before the joinery of the instant invention. Tests showing the capabilities of such joinery are on file in the Patent Office in my Serial No. 229,852, filed June 4, 1951, and a portion of which is now Patent No. 2,850,890 and show e.g., 2,000 p.s.i. in shear testing the values of the glass-fiber-polymeric resin compositions used. Subsequent applications of record show additional proofs by tests of such joinery features.

From my early research and development work upon which concepts were disclosed in prior applications of record, it was early seen that if the concept of "gluing together porous structural materials such as concrete blocks, etc., in the building of masonry structures or other porous material structures" were to be made universally practical and useful, means had to be provided comprising materials for and methods of using the same which would provide uniform integrity of structural embodiments in a structural engineering manner. The "know-how" required in the chemical and materials engineering of such structure lay initially in fields directed to military uses of the several materials useful in the concepts of structure of my research and development of products and methods. Since little chemical engineering "know-how" is common to the wide spread construction industry means had to be found providing formulations of polymeric resins, rubbers and elastomeric compositions and reinforcing fibers and fillers therefor which would be fool-proof and require no knowledge of resin composition compounding. In assists of this requirement, apparatus and method adapted to rapid installation methods appeared as vital to the mass use successfully of the important structural features my early work indicated were available from the composite structures I built.

The apparatus and methods of the instant invention bring together concepts disclosed but not claimed in prior disclosures and point out improvements and features found by research and development to be means that insure on the basis of the tests made that pre-packaged product of the invention provided in convenient handling and processing means would provide joinery having structurally available strengths and features in uniform embodiments making real the continuity of designed structural bonding and strengthening of porous structural materials, e.g., concrete blocks.

The reel-unit of my Patent No. 2,951,006 provides features and materials useful in the instant invention.

By formulating polymeric resin compositions, rubbers, synthetic rubbers, and elastomeric substances in conformance with the art of resin compounding with fillers, fibers, catalysts and setting agents and other discrete chemicals as required in any particular embodiment when provided in the apparatus of this invention, I found that reliability of structural engineering features were obtained and were able to be continuously obtained with very little variance of structure. As shown by polymeric resin compositions having calcium carbonate, or sand particles, silica flour, sand washer tailings, and/or glass fibers, joinery was made of "resin-crete" mortar, which I placed by means of a trowel as is done with cement mortar. The "pot-life" of such mortars was limited— and moisture or environmental temperatures, or other impediments indicated that for truly low cost and uniformity of structural integrity such compositions while much improved over cementitious mortars were not applicable to the meeting of code approvals of mass produced masonry structures. Any hod-carrier could not be trusted to make the joinery materials, even though careful instructions were given. In addition, a fear of the chemicals such as epoxy resins, and the odors, indicated that a more expeditious way must be found to really remove cement mortar as a joinery means in masonry construction and provide the very improved features of joinery proven in the research and development of the prior applications.

The mixing of "resin-crete" having a predetermined pot life was resorted to and the "gunk" placed into caulking guns for easy placement. The gunk made at a formulation designed for one temperature as in the morning when not used up in the time period provided, or when in an environment of rapid change of temperature from e.g., cool to hot, advanced in set, so that when placed, if yet placeable, would not provide the properties desired or as designed. The basic uniformity most needed while able to be provided by skilled personnel, could not be provided by the average mechanic because of his basic lack of "know-how" of chemical compositions, and this through no fault of his, but rather because of the nature of the materials. Even cement mortar in the hands of the hod-carrier is a very variable product. Water is added indiscriminately—and the setting of the complex setting of Portland cement interfered with, just by the normal environmental conditions prevailing on any construction job. A shear value of 80 lbs. to e.g., a maximum of 300 lbs. is allowed by the Uniform Building Code for common masonry mortar.

Referring now to FIGURE 1 which is essentially the design of apparatus shown in FIGURE 14 of my Serial No. 542,658, filed October 25, 1955, a vessel $89v$ having holding handles $90v$ and $147w$ is connected to a transporting device $149v$. In the vessel $89v$ a reel-unit $97v$ comprising a fibrous reinforcement stranded material $112v$ is disposed and the reel-unit $97v$ mounted upon an axle $144x$. The vessel $89v$ may be of metal, or plastic, or wood, or any useful material, e.g., fiber-board lined with polyethylene, or blow-molded or cast polyethylene, Teflon, or any plastic composition useful in packaging polymeric resinous compositions as disclosed and claimed in my prior applications, e.g., my Patent No. 2,951,006.

A preferred, but not the only useful material $153w$, is provided by polyethylene; or polypropylene or polyvinyl chloride resins. Blow molded bottles and vessels provide low cost disposable packaging means. It is the intent and purposes of one featured embodiment of this invention to provide mass produced, low-cost packaged materials in disposable containers of metal, paper, plastic resins, etc., which as in my reel-unit in Patent No. 2,951,006 provides processing and handling and transporting means in one and the same packaged ready-for-use materials and their containers.

Attached to the container $89v$ there is shown a "mixer device" $137w$ which is fastened to the body of vessel $89v$ by means of fasteners $125v$ and such mixer device and connection is intended to mean any kind of convenient means without limitation. Such a "mixer device" $137w$ as shown comprises a cone shaped element $117v$ but may be a trough or other collector mixer device attached to the vessel $89v$ at an opening therein in vessel $89v$ by means of fastening means $127v$. The cone shaped element $117v$ is illustrative of a device directed to collecting the fiber $112v$ after it has been unrolled from the reel-unit $144w$ and pulled down through the liquid or fluid or paste-type of polymeric resin composition $110v$. Fiber $112v$ is pulled around guide rolls $96v$ and $96w$ and in between sizing rolls $94v$ and $94w$ and thence out through the opening around the "mixer device $117v$," which by the resistance over its surface under the tension of pulling of the fiber $112v$ and/or $121w$ of disclosure as being drawn from a companion vessel as shown in FIGURE 3, is pulled out through the sizing orifice and shaped to become the impregnated ready for use joinery means shown as $119w$. Orifice $123v$ may be of any shape adapted to the nature of the reinforcement and joinery means, and one embodiment, but not limited thereto, is shown in FIGURE 2.

In FIGURE 2 the sizing orifice comprises a plate like element $137bw$ which is held in place onto vessel $89v$ by fastening means $125bv$. Fibrous reinforcing material $87bv$ is impregnated and covered with a polymeric resin composition $59bv$ and longitudinal reinforcing means such as uni-directional glass fiber strands are shown at $80bv$. In pulling the fibrous reinforcement through the bath of polymeric resin composition at times surplus resin composition is drained off and flows back into the vessel $89v$ through drain $128v$. Alignment against a porous structural unit is obtained by pressing ledger $139w$ against the element when pulling a length of stranded or tape or other type of reinforcement onto a series of masonry bodies then being joined.

The device of FIGURE 1 can be apparatus directed to the processing and placing of a single element having a polymeric resin composition in its at ready state as e.g., by being catalyzed and usable for a predetermined pot life. Many such adhesives are available which will provide joinery in what are known as one component systems.

The device of FIGURES 1, 2 and 3 may be suited to two or more component systems and in this use provide combinations of resin systems which have a limited pot life but do have properties considered very advantageous in the joinery of masonry structures or other porous structural structures and components.

Of great importance to the use of polymeric resins, rubbers and elastomeric compositions I have found that the two component systems may be packaged in e.g., polyethylene or metal containers and have fillers and activators and other essential ingredients as disclosed in formulations later disclosed, packaged in the chemical plant environment to exact standards of manufacture, and when united into the processing and dispensing device such as in FIGURE 1, FIGURE 2 and FIGURE 3, be used so that the two components are mixed only as used. By pulling the fibrous strand $112v$ and the fibrous strand $121w$ from their separate reels and impregnating each with co-polymerizable constituents of the formulation as provided in packaged-ready-for-use as e.g., in polyethylene container lining $153w$, the resinous materials are united on the "mixer device $117v$" and are in condition then to polymerize the resin composition constituents in a predetermined time related to the processing and placement of the joinery means this means provides.

Only that portion of the polymerizable materials needed for the instant joinery and joint is used and being in a state of long life until united one with the other, the constituents of the polymerizable resin composition are thus used without any waste. In this case the drip back feature $128v$ is closed off so that polymerization cannot take place by mixture in vessel $89v$ if it be a two compartment vessel.

While embodiments $112v$ and $121w$ are shown as cord-like stranded spooled reinforcing means there is no intention of limiting these reinforcements in any manner as tapes, multi-stranded elements, loose fibers, woven tapes and webs, unwoven tapes and webs, may be used with equal facility. These fibrous elements and members may be provided in their dry state or they may be provided in their pre-impregnated state as for example, glass fiber roving impregnated with "B" staged resin systems which have several features most advantageously used. Glass fiber of remarkable high strengths is available when the manufacture of such fibers involves impregnation of the just made fibers at the orifice of the machine from when they are spun under the uniform tension and quality control conditions directed to provide high integrity of structural considerations of the spun glass fiber. Tensile values of e.g., 235,000 p.s.i. and flexural values of 250,000 to 259,000 p.s.i. in ultimate strengths are available in commercial fiber glass. Modulus of elasticity of about 9,500,000 p.s.i. is to be had in certain manufactured glass fiber reinforcements and the composition of resin embedding the glass fiber and the fiber itself shows remarkable "wet strength" retention of about 97% on the basis of the standard A.S.T.M. 2-hour boil test.

But this is not the only important features of such reinforcing materials, because by combining such quality controlled glass fibers, and their handling resin systems embedding them, and packaging them in the devices of the instant invention along with other necessary ingredients used in making the end product involved in the use of the invention, a quality controlled highly useful means of fabrication of porous structural bodies is made available.

Figure 4:
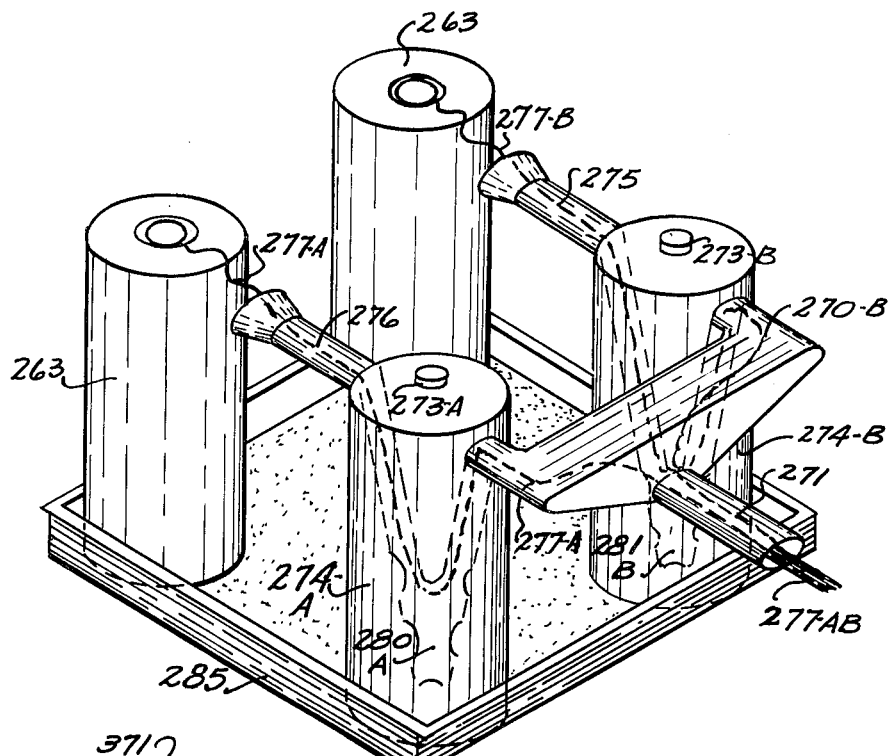
FIGURE 4 is an isometric view of apparatus adapted to two or more resin rubber or elastomeric compositions being combined at the time of use.

Referring now to FIGURE 4 which shows an isometric view of apparatus comprising means of processing standard packages of e.g., glass fiber roving or other spooled fiber or tapes. Element 263 may be a roving package as received from the glass fiber manufacturer, e.g. Owens-Corning Fiberglas Corporation "Fiberglas Plastics Reinforcing Roving, a product made by combining 60 ends of 140's continuous strand, treated with a chrome complex sizing and wound without twist or binder yarn." Such package of roving averages 235 yards per lb. and has a nominal sizing of 1.5% average with a nominal number of ends of 60 ends plus or minus 4 ends. Such roving has integrity so that strands dropped from a height of six feet shall separate freely when cut and dropped. Such a product is provided in packaging means providing a reasonably uniform product in a ball type of a nominal weight of about 35#. Such fibrous strands are illustrative there being no limitation made.

Figure 5:
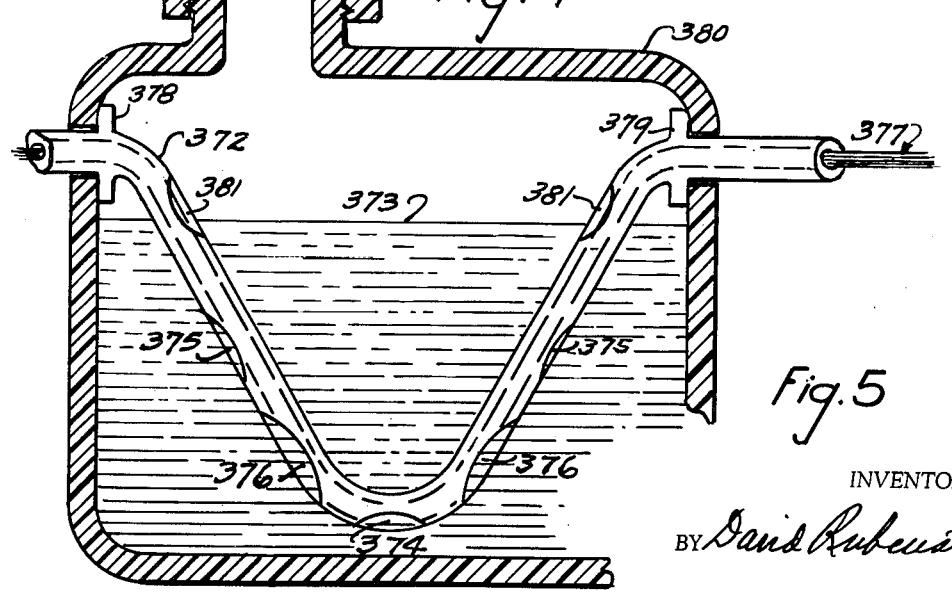
FIGURE 5 is a cross-sectional view through a polymeric resin, rubber or elastomeric material container showing fiber guide and impregnating tube provided with the container.

To make use of such glass fiber roving as joinery reinforcements one or more such strands each pulled from a package of roving of which two are shown in the device of FIGURE 4 and are pulled through tube 276 into vessel 280A through impregnating and mixing tube 372 as shown in FIGURE 5. The vessels materials 274–A and 274–B may be polymeric resin composition comprising unsaturated polyester resin in which e.g., vessel 280–A the unsaturated polyester is provided with a relatively long life benzoyl peroxide catalyst, e.g. methyl ethyl ketone peroxide a liquid catalyst provided in from 0.5% to 1.0% by weight on the resin composition while in the vessel 281–B an equal amount of unsaturated polyester resin is provided with an accelerator adapted to induce curing at ambient temperatures comprising e.g., cobalt octoate in amount of 0.05% to 0.2% or other suitable amount depending upon the time set as the required curing time in the use of the combination of unsaturated polyester resin impregnated into the glass fiber roving as combined. Other catalyst systems are known and can provide features useful that make the resin structure of the invention. In my copending application Serial No. 668,285 filed June 25, 1957, is a very comprehensive disclosure of polymeric resin systems based on unsaturated polyester resins and materials for catalysts useful in such systems, and is considered as a part of this disclosure as though herein entered.

The container advantageously is made of polyethylene resin as a blow-molded bottle or vessel and as such made as a low cost disposable unit. Epoxy resin compositions as shown in formulations later disclosed herein packaged in one vessel and e.g., polysulfide rubber resin packaged in another vessel and each having filler or not as designed, are impregnated into stranded constructions, e.g., roving as the roving is pulled through the vessels through each vessel and into the combining chamber 270–B and out into the place of use through feed tube 271 so that glass fiber 277–A and glass fiber 277–B are combined into catalyzed or mixed for setting resin composition impregnated glass fiber joinery material 277–AB.

While individual elements 263, 275, 276, 280–A, 281–B, 270–B, 271 and 285 are shown as individual elements there is no limitation intended as two or more and/or all of the elements may be provided in multi-compartmented elements or in one package and provided for specific reinforcement of porous structural bodies as for example, a package having all the necessary components for joinery bonding together concrete blocks or panels, etc. The resin compositions are available by such means to be provided in predetermined formulations and may be used as needed without waste of either the resin compositions or the fibrous reinforcements. The resin compositions are intended to include fillers, pigments and extenders as components directed to specific embodiments and as disclosed in my copending applications of record, e.g., Serial No. 743,464, filed June 20, 1958, now Patent No. 3,111,569 and its prior filed applications to which the application is a continuation-in-part.

In FIGURE 5 a sectional view of one container 380 made of blow-molded polyethylene resin is shown wherein a "mixing tube 372" provided in the container has features directed to efficient impregnation of the fiber, e.g., glass fiber strands 377. By providing openings 375 and 376 on the sides facing outwards, the mixing tube admits resin composition to the tube inside, and an opening 374 on the bottom admits resin as well as acts as a drain opening. Openings 381 placed on the top side of the mixing tube above the level of the resin composition in the vessel lets entrained air out of the tube and induces full flow of resin into the fibers of the fibrous reinforcement being pulled through the mixing tube. Additionally, the tube confines the resin impregnated fiber in an unorganized manner so that it is not disorganized in fiber arrangement. The tube is sized so as not to bind the fibers and may be oversize or not as required by the individual fibers type then being used. The tube 372 is shown with press fit ends which may be welded or otherwise connected to the body of the vessel so that no leakage of resin composition may occur in transportation or use. A convenient feature not shown is to provide a polyethylene tube having a wire or other means to which a loop or slot or other means is found by which to draw the initial strands of reinforcement from the package containing the same as e.g., roving package 263.

While the container of FIGURE 5 is disclosed as a polyethylene resin blow-molded bottle or vessel, other materials are useful in specific uses. Metal cans, paperboard having discrete finishes, as for example aluminum foil laminated thereto, aluminum cans or containers, steel cans, plastic resin packaging of vinyl chloride resins, saran, polymerizable resin containers adapted to opening by heat or pressure for inserting catalysts inside of e.g., polyethylene bottles, puncture type containers for catalysts as disclosed in my prior applications, e.g., Serial No. 345,084, filed March 27, 1953, and in general the means of commingling resin compositions and catalysts or setting agents therefor as is disclosed in my prior applications of record, all as needed when in conformity with the objects and uses of the present invention, are intended to be considered as disclosed herein as though originally disclosed herein.

Figure 6:
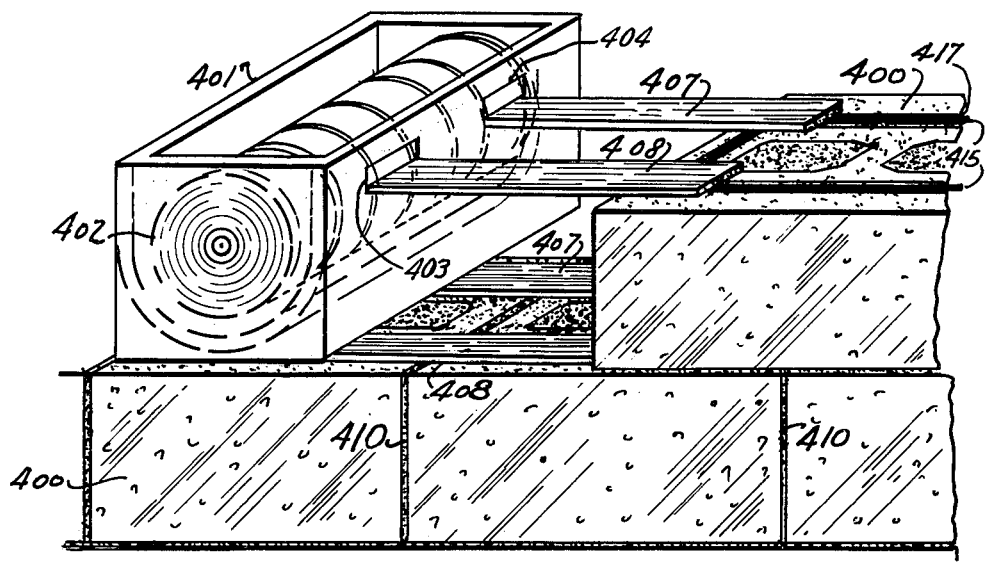
FIGURE 6 is an isometric view of a device providing preimpregnated Fiberglas glass fiber reinforcing tape or other fibrous reinforcing and carrying tape showing its use in making horizontal joinery in a masonry wall.

Referring now to FIGURE 6 a portion of a concrete block wall is shown being laid up with joinery of the instant invention. The blocks are shown as having a specular face of a decorative structural nature as disclosed and claimed in my Patent No. 2,951,001 or as disclosed in my Patent No. 2,850,890. The blocks may be sized and dressed to a uniform size as shown in my Patent No. 2,805,448 and in particular, when so sized as by grinding, provide a uniformity of laying enabling the use of thin layers of preimpregnated polymeric resin composition fiber reinforced joinery as is shown as members 407 and 408 in FIGURE 6 and which polymeric resin composition includes catalyst means adapted to be activated by known means and by pressure.

The joinery material shown in FIGURE 6 represents a tape or belt-like element of discrete width and thickness comprising a plurality of unidirectional fibrous stranded elements, e.g., glass fiber yarn or roving having in one embodiment thereof, an enclosing layer of polymeric resin composition being fully embedded into the body of the fibrous element and having a surplus of said resin composition enabling it on being pressed against the blocks upon which it is laid to enter into the adjacent pores and interstices of the block. The polymeric resin composition contains a catalyst system means shown at 415 and 417 as catalyst carrier means adapted to setting in a time related to the laying of the elements comprising the wall, e.g., a curing rate of 4 hours before final set, or one or two days before set, such time rate being a designable chemical engineering problem easily solved by the known art of resin structures, even a few minutes time.

The reinforcement materials shown in FIGURE 6 are provided in a stock packaged design adapted to providing the tape-like elements 407 and 408 as all the joinery material needed to lay up a masonry or other porous structural material wall of concrete block, cinder block, stone, brick, glass, ceramics, or in fact any porous structural material disclosed or found adaptable to such joinery means. Container 401 is provided as a closed package as shown with its top taken off to show the contents of the package. The rolls of fibrous reinforcing having their resin composition having its catalyst means in said resin composition in discrete amount for adequate bonding may be provided as individual rolls or may be provided as a plurality of rolls e.g., 1″ in width and 1/16″ in thickness, or e.g., 2″ in width and 1/8″ in thickness, or in fact any suitable width as designed for specific uses and of a thickness providing the structure of the joinery and joint sought. In using pluralities of rolls of reinforcing material for joinery of concrete blocks, a convenient package has a slotted opening and over which opening is a moveable guide slot so that e.g., in an eight inch concrete block width of wall two strips of e.g., 1½″ width tape that is 3/8″ thick or is 3/16″ thick in conformity with a specific design may be pulled out of the package and immediately applied to the outer shells of the concrete block. By cutting off short lengths as needed head joints 410 between blocks may be made. Another means of making head joinery 410 in vertical joints as shown in FIGURE 6 and is shown in the parent application in FIGURE 15 and an adaptation of this feature may be made by the instant features of FIGURE 6 if the joinery materials are used in vertical manner extending upward by being placed alongside of passing horizontal joinery means. Continuity may be had in either horizontal or vertical joinery to meet designs needs or may be used together. No limitations are intended in size of joinery elements or members or materials because concrete structures and the other porous structural elements require many sizes and types of such joinery means.

Advantageously, the pressure of subsequent courses in the case of brick or concrete block walls as in FIGURE 6 and other structures provides the weight needed in certain of the joinery embodiments disclosed in prior applications with the means to release catalysts or setting agents or otherwise provide the means of setting up the polymeric resin compositions wherein pressure is a factor in such setting.

Figures 7, 9:
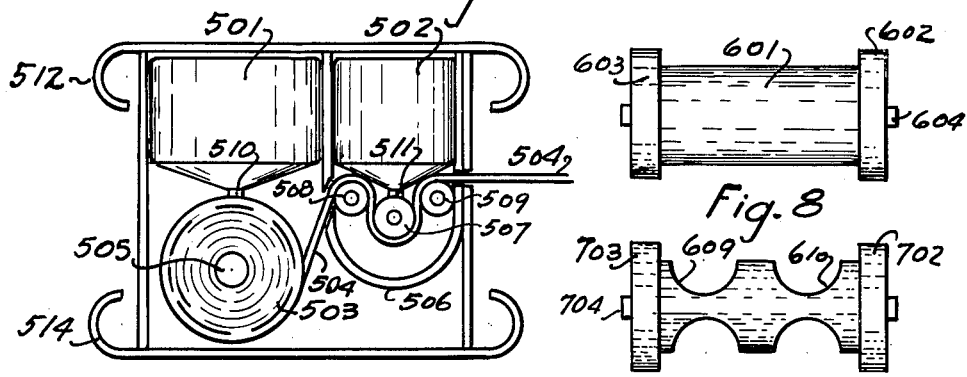
FIGURE 7 is a cross-sectional view of a gravity feed type dispenser apparatus and pull-type joinery element.
FIGURE 9 is another spool for use in the apparatus of FIGURE 7 providing two rounded shaped joinery means.

FIGURE 7 shows a sectional elevation of a gravity type feed dispenser for joinery materials. A container of any type of material, e.g., a polyethylene blow molded bottle in a pint, a quart, a gallon or five gallon size, or in fact any size, 501 is supported on a holding and handling frame 512. Adjacent to it a similar polyethylene blow-molded bottle is also supported shown as 502. Bottle 501 and bottle 502 have each at least one capped orifice adapted to emitting a regulated amount of fluid from the bottles when placed in an inverted position as shown in the FIGURE 7. Suspended upon axle 505 is a roll of fibrous tape, e.g., fiber glass tape, or e.g., a roll of nylon rope or yarn, or e.g., a roll of roving of a discrete number of ends of unidirectional fiber, e.g., 30 or 60 end roving; or hemp fibers, or sisal fibers, or in fact any adaptable organic or inorganic fiber useful alone or in combination spun or linear or woven fiber that meets design need for any specific embodiment. Asbestos fibers and fiber glass roving; sisal and metal wire; wire and fiber glass; synthetic strands such as nylon, saran, polyethylene, polypropylene, etc., are useful fibrous or metallic materials in this form.

As is obvious two or more rolls of fiber strands may be packaged on the device of FIGURE 7 and used as in FIGURE 6 with a single measuring orifice for the two or more tapes or stranded members or with multiple individual measuring orifices. An advantageous construction is to provide a setting agent in e.g., bottle 502 and an epoxy resin composition with or without filler in bottle 501 and provide a roll of fiber reinforcing under each bottle orifice. As the two tapes are pulled at the same time from their respective rolls, each picks up the right amount of resin and/or setting agent. On being pulled out they may be combined and in this combination act to commingle the resin composition and the setting agent so as to start polymerization of the resin system. As the composite is placed on the masonry wall elements and the subsequent masonry elements are applied onto the previous laid elements, the weight of the elements further presses the catalyst or setting agent carrying tape into and against the resin carrying tape. This makes for a mixing of the materials of the system and as a result polymerization of the resin system is had. The nature of the resin system and its setting agent or catalyst determines its timed cure cycle. Obviously, one or both tapes may be pre-impregnated materials and have additional setting means added or not as required.

The tape 504 is pulled from reel 503 onto guideroll 508 and around metering roll 507 and onto guide roll 509 from which it is ready for application for the joinery means intended. Instead of metering orifice 510 emitting measured amounts of e.g., epoxy resin composition from bottle 501 onto the fiber tape of reel 503, this orifice may be so built that it feed onto the tape at the guide roll 508 thus keeping the tape in a dry position at all times. Drip pan 506 may be a disposable unit of polyethylene or other material, e.g., paperboard. It is obvious that different combinations of features may be combined on the principle of invention herein disclosed and no limitation is intended within the scope of the specification and the claims.

In FIGURE 7 a unit is essentially provided that contains all the materials for making product utilizing polymeric resin compositions, fibers and on occasion fillers because fillers may be provided in containers and fed onto the roll in the manner of the resin compositions, or advantageously may be premixed discretely into the resin composition or the setting agent composition. More than one roll superimposed over another may be utilized so that materials which would not be practically used if packaged together because of e.g., curing natures or other reasons, e.g., safety in use, or structural characteristics desired, may be most advantageously used to provide the several features of inventions shown in my prior applications of record and prior patents of issue.

The reel-unit of the type shown in FIGURE 7 is an improvement upon certain features of prior disclosures, one important feature being that it may be transported on the frame elements 512 and 514 to place of use in a most convenient manner. In handling before use the packaged materials in the carrying frame are placed so that they rest on the element 512. In use the frame is turned over and gravity forces act to flow the resin compositions and setting agents, or any other material found dispensable or used by such dispensing method within the concept of the features of the invention or its proper uses. When the immediate use is over, the device is turned over and the contents of the bottles 501 and 502, etc., are retained and ready for use so that at no time in the use of the device is waste occurring. The important feature of making such a product in a factory under mass production methods and under the proper design and engineering and quality controls insures uniformity of resulting structure. The chemical engineering of the product is done by qualified personnel and on-site job labor as is found in a factory or as found in the normal construction of building and engineering structures are not involved so that the product cannot be misapplied or misused. Precision and uniformity required by building code and other structural or esthetic requirements is always provided.

FIGURE 8 shows an elevation of a metering spool 601 having side guides 602 and 603 and axle 604. Obviously this spool makes for uniformity of sizing and manufacture on the site of the joinery means. It may be made out of polyethylene or other type materials, metal, wood or plastics of a low cost nature and disposable is desired, i.e., used just one time so that exposed resin composition is not used.

FIGURE 9 shows and illustrates a metering spool having half round grooves 609 and 610 with side guides 702 and 703 and an axle 704. The grooves may be any number and are of the type shown in the apparatus shown in my copending application Serial No. 345,084, filed March 27, 1953, of which this application is a continuation-in-part. The size of the grooves and their shape determines the nature of the shape of the reinforcement and its location as drawn from the device and used. Used as cable forms or reinforcing rod forms in its final use, such reinforcement can be made to exact specification and of a uniformity over and above any other on-site means with the added advantages that the resin system may be set and cured in place as bonded structure so that a composite structure of the reinforcement and porous structural body results which is believed to meet code approvals for structure made not possible with cement mortar or the like.

FIGURE 9 may be of any size consistent with its related use of the device of FIGURE 7.

Figure 10:
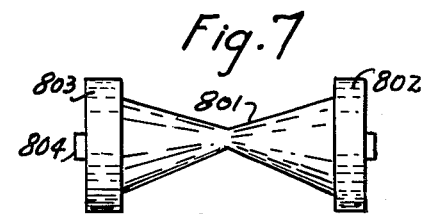
FIGURE 10 is another spool for use in FIGURE 7 apparatus providing a centering means for making joint material.

FIGURE 10 shows another type of spool having a V-shaped body 801 and side guides 802 and 803 and an axle 804 and this may be made similar to the spools of FIGURES 8 and 9. The V-shaped spool centers the roving or tape or other fibers and delivers an exact spacing of the reinforcement from the making device. Any such spool may be of a simple nature and disposable material so that resin composition which may be injurious or poisonous in and of itself may be kept from human or animal contact after metering over such a spool.

Figures 10A, 11:
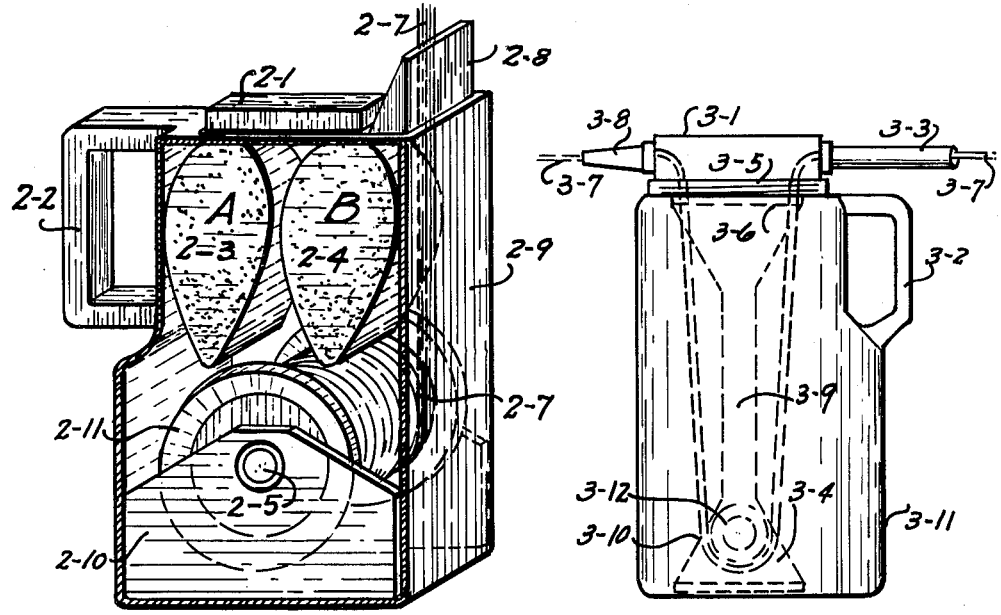
FIGURE 10a is an isometric view of another embodiment of the invention having a single container packaging resin components A and B in ready-for-use state and reel-unit of glass fiber reinforcing strands.
FIGURE 11 is another embodiment of the invention having a dispensing cap and device.

Referring now to the FIGURE 10a, this embodiment shows a vessel of metal or plastic, or other material, e.g., a commercial tin can or a blown or cast polyethylene vessel of the shape and features of the invention.

Inside of the vessel 2–9 is disposed a reel-unit of fibrous material, e.g., Fiberglas glass fiber strands (but not limited thereto) mounted upon a reel-unit 2–10 which may be made of plywood, metal, fiberboard, plastic, or in fact any other suitable material. Above the reel-unit of glass fiber strands, or other strands, is disposed two plastic resin compositions containers marked A–2–3 and B–2–4 in which are packaged components of a two component resin composition system as e.g., a polysulfide liquid polymer (Thiokol LP–3) and an epoxy resin Dow No. 2633.11, or any other useful epoxy resin having an epoxide equivalent, 175–210; mol. wt. 350–400; viscosity 5,000–16,000 cps. at 25° C. and does not contain reactive diluents such as diglycidyl ether.

The respective components 2–7, 2–3 and 2–4 comprise the substantially entire material components of a joinery means of the invention and are provided packaged ready-for-use in a vessel so that a mechanic just has to take a sharp instrument and insert it into each of the components containers A–2–3 and B–2–4 making a hole in each so that the component A comprising e.g., the liquid polymer polysulfide (Thiokol LP–3) and the epoxy resin component B comprising e.g., said Dow epoxy resin No. 2633.11 and their contained pre-mixed fillers or other component materials, are released into the vessel 2–9 so that they flow together and are mixed in and on the fibers of the glass fiber 2–7 and continue being mixed as the impregnated strands are pulled from the vessel through spout 2–8. When cap 2–1 is a sealed, tight lid or is adapted to not leaking any of the contents, the vessel and its contents can be tilted onto side 2–9 or to any angle adapted to aid in placing the joinery material of impregnated glass fiber strands with its desired amount of polymeric resin composition. In connection with metering the amount of polymeric resin composition a slide top adjustable opening frequently useful but not shown is provided as a component of spout 2–8. Also a cover cap for this spout is provided if the vessel's polymeric resins have a pot life in excess of a one use of the device.

As is shown by this embodiment, the handling of polymeric resin compositions which might have an industrial hazard to personnel handling and using this type of joinery, features of the embodiment clearly make available a means avoiding substantially all of such hazards. Being disposable packaging of a low cost nature, the vessel is disposed of when emptied.

In FIGURE 11 is shown a vessel having a wide mouth top opening and provided with a screw type lid. The vessel may be of metal or of a plastic resin, e.g., polyethylene resin or polypropylene or the like, as adapted to any particular packaging means desired. The lid features of this embodiment of the invention, comprise lid 3–1 having an inlet hose opening 3–3 and an outlet nozzle 3–8 and being fitted with threads to screw down onto the vessel 3–11. Attached to the inside of the lid is a holder device 3–9 having an upper bell shaped portion 3–6 attached to the lid 3–1 and a bell shaped portion 3–4 at its lower end. In the portion 3–4 an opened portion provides a passage for guiding fiber strands 3–7 which are brought from a reel or roll of fiber into the inlet hose 3–3 and down through guide 3–10 and up through the contents of the vessel and out through nozzle 3–8 so that strands 3–7 are provided in an impregnated condition ready for application as a joinery or reinforcing means. In this vessel a polymeric resin composition of the one-component type can be used, e.g., an epoxy resin having a catalyst or setting agent incorporated at the time of packaging and having a pot life adapted to its proposed end use as known in the art. Alternatively, a disposable lid of the type of this embodiment can be supplied for multiple uses. This embodiment is very useful in an assembly of components as in FIGURE 12.

If the device of FIGURE 11 is used in a closed system wherein a pressure can be maintained on the glass fiber strands and polymeric resin composition, one very useful embodiment of the invention is provided designed to supply a measured quantity of polymeric resin composition and glass fiber strands by pressure means as e.g., by air pressure on the principle of a flow gun.

Figures 12, 16:
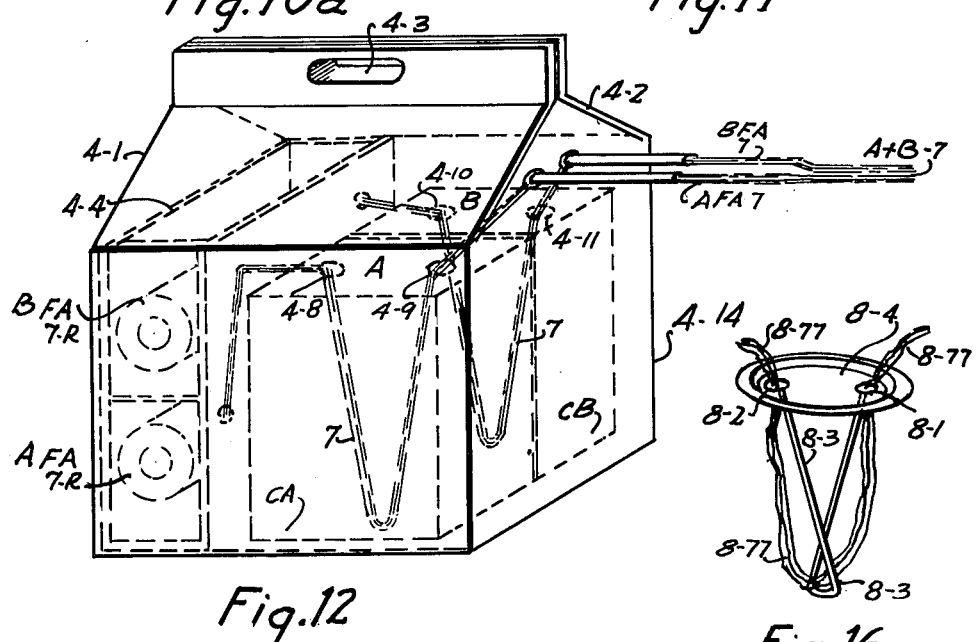
FIGURE 12 is a composite packaging means of the invention having a set of disposable elements for containing components of the invention.
FIGURE 16 is a view of a can cover for replacing the standard cap usually provided on a metal can package or other material can of this type, with a capping device joined to a mixture device utilized in some of the embodiments of the invention.

FIGURE 12 shows an isometric view of a packaging means made of metal or plastic, but preferably made of paperboard stock, e.g., corrugated kraft paper stock of a substantial weight and adapted to rough handling in shipping and use. From one sheet of such paperboard the box shown as 4–14 is die cut and creased and assembled by gluing one vertical edge and the bottom seam. The top is made of two pieces extending from the opposite sides so that top portion 4–1 and 4–2 cover each other when in place as a sealing lid to the package but when opened up provide the handle cover as shown with hand hole 4–3. Ends are turned up vertical and in one end two holes are provided for pulling through them the outlet tubes BFA–7 and AFA–7 as strands that are impregnated strands for joining together as joinery and reinforcement strands A–B–7.

Fiber reels BFA–7–R and AFA–7–R, e.g., glass fiber roving 60 end 140's or Dacron, i.e., polyethylene terephthalate fibers, or sisal, or hemp, or cotton, stainless steel wires and glass fiber strands in combination, or any other useful fiber or that particularly useful in tensile strengths of the fibers, are packed in fiberboard compartment 4–4 as a reel-unit on horizontal reels or as vertical reel-units directly feeding into each of the polymeric resin containers of the invention, as e.g., A and B resin components in cans CA and CB. Fiber 7 is pulled through each of the cans CA and CB to provide the impregnated fibers BFA–7 and AFA–7. In certain constructions the fibers may be identical and in other constructions may be different fibers, e.g., one being glass fiber stranded roving and the other being polyethylene terephthalate fibers. In place of roving type fibers, woven tapes or combination of wire and stranded fibers may be used. The embodiments shown in my copending application Serial No. 345,084, filed March 27, 1953, having fibrous constructions with packaged catalyst constructions in the fibers or attached thereto, may be used as one or both components as impregnated joinery materials or as reinforcements that are catalyzed in place by the combination of materials in place. The packaged components are used directly from the package which ensures accurate compounding of the chemical materials at their source of manufacture and packaging. Upon a desire to stop using a joinery means during a construction operation as inevitably occurs, the embodiment of the invention makes possible a means that eliminates wasted polymeric resin compositions that are mixed and whose pot-life by the nature of the materials used, is a limited pot-life. The mixing is done outside of the vessels containing the polymeric resin compositions so that at no time is a waste use made from this cause. The control of time of setting of the polymeric resin compositions by this means is as accurate as possible taking into account the environmental effects on the setting. The structural engineering qualities of the end product joinery is available as a quality controlled product assuring the Building Code Authorities that one of their constant problems of integrity of joinery is achieved. As compared with cement mortar in the joining of concrete block masonry, strengths of 80 lbs. to 300 lbs. in shear attributed to cement bonding strengths never is an assured strength in the field because of the nature of the mixing of mortar, variations in water, cement and sand contents as invariably occurs in the field. The instant invention clearly overcomes these handicaps of quality control and over this produces a joinery fabrication such as provides strengths of 2,000 p.s.i. and more as shown on A.S.T.M. approved laboratory tests.

The particular package of the instant embodiment is a standard square package for shipping purposes and in the field of use, provides an apparatus or tool that makes a very convenient means in the provision of joinery means. The features of FIGURE 16 may be utilized in the cans CA and CB if desired.

Figure 13:
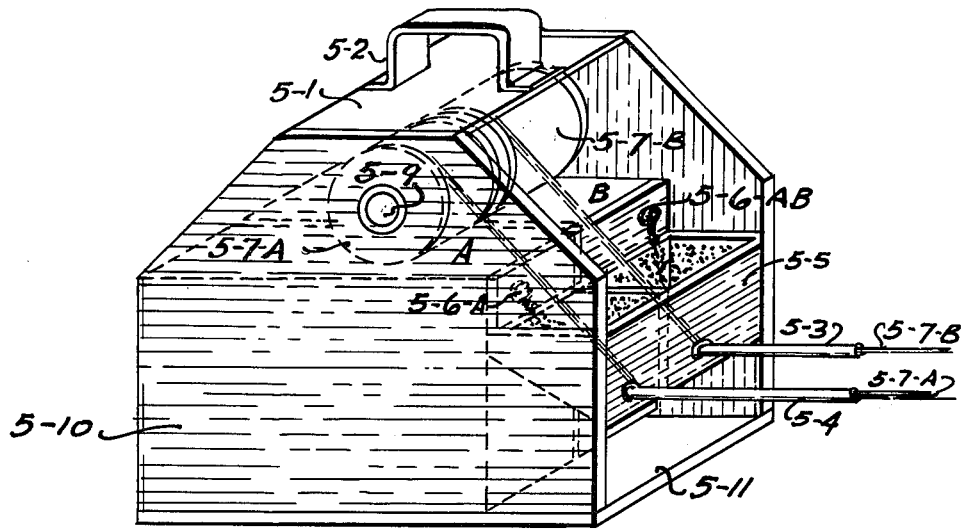
FIGURE 13 is another packaging means of the invention.

Referring now to FIGURE 13, the embodiment comprises a packaging and handling means that will take standard gallon or other size cans or packages. The cans A and B are placed in a holder frame 5–10 so that 5–10 frame can act as carrier for the cans A and B and also carry a mixing vessel for attachment to the cans A and B shown as element 5–5.

Holder frame 5–10 is provided with two reels of fiber, e.g., glass fiber roving that is type "E" glass fiber or type "W" glass fiber or even a pre-impregnated glass fiber roving impregnated with "B"-staged epoxy resin composition. Other resin compositions of polymeric resins, rubbers, synthetic rubbers and elastomers may be used as disclosed in my copending applications. Some of these are phenolic resins, polyurethane resins and elastomers, unsaturated polyester resins, and in general any resin system or combination of systems known in the art may be used, i.e., that has the requisite structural characteristics for the joinery.

Figure 17:
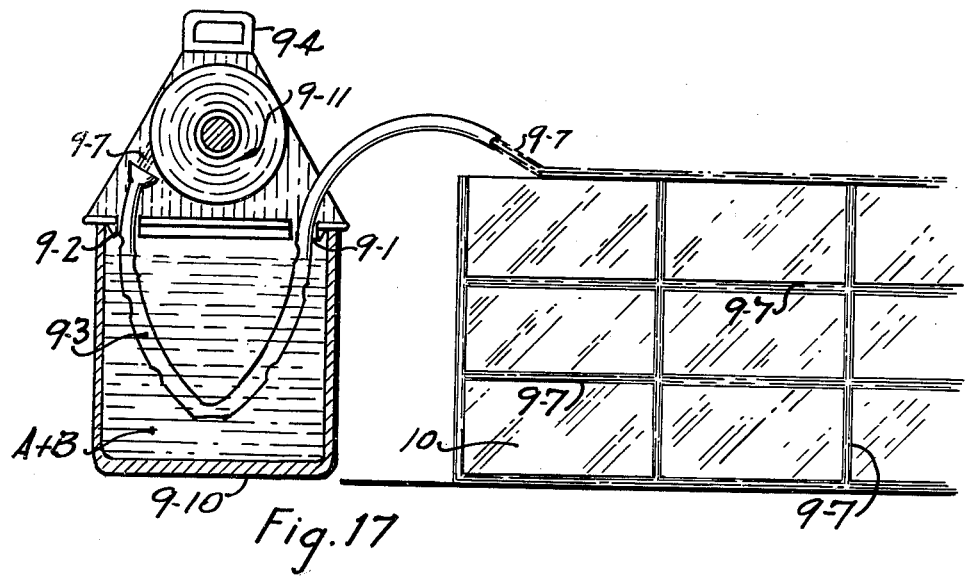
FIGURE 17 shows a view of a partial portion of a dispensing reel-unit of the invention applying joinery to a masonry wall.

Fibers 5–7–A and 5–7–B are such fibers and the resins in the cans A and B are such impregnating materials. In the case when it is designed that at combination, a predetermined time is available for placing of the fibers of the joinery means in its encased saturated polymeric resin composition, the mixer vessel 5–5 serves to utilize that amount found useful for the specific embodiment then being made. Ports 5–6–A and 5–6–AB are opened to flow out enough of the two compositions for any one use. Impregnated fiber 5–7–A and 5–7–B are pulled from the reels in dry or pre-impreg state and then are pulled through the vessel 5–5 and out through feeder tubes 5–3 and 5–4 and are combined at the point of use as is shown in FIGURE 17. The holder frame 5–10 may be of plywood and reusable, or it may be of a disposable material, or if desired as a permanent tool, may be of metal. The base of the holder frame 5–11 may be a smooth surface as shown for sliding along a wall, or it may have rollers (not shown). A convenient type of handle 5–2 fastened to top 5–1 may be of metal, or may be of a folding material as is canvas or plastic, so that a stack type package is available for shipping in the least space. Kits of e.g., 1 holder frame and several resin components and fiber components may be provided so that for the average construction use one frame holder will be supplied with e.g., each ten to 50 combination units comprising the total materials. In the case of materials that set up vessel 5–5 as they are being used, this vessel may be a disposable waxed paper or polyethylene type of vessel and thrown away after each use or each day's use, with additional vessels 5–5 being provided. Volume production of the materials provides standardized, low cost joinery of the invention.

Figure 15:
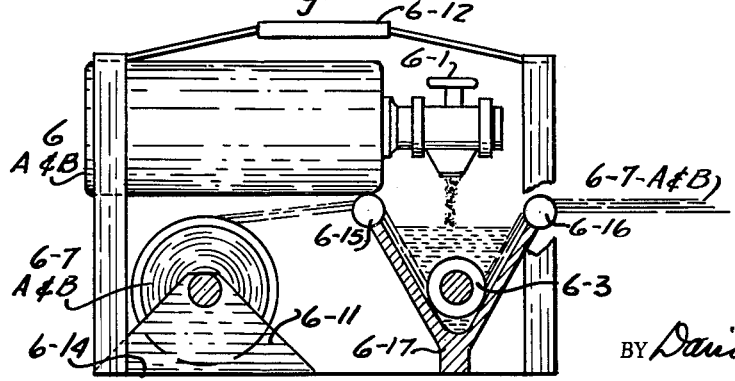
FIGURE 15 is an elevation of FIGURE 14.

FIGURES 14 and 15 show a plan view and an elevation view of another embodiment of the invention, comprising a holder frame for two reels of fibers, e.g., glass fiber roving or tape of discrete strengths and functions. Reels 6–A–7 and 6–B–7 are located below the polymeric resinous materials containers 6–A and 6–B. Valves 6–1 and 6–2 in containers 6–A and 6–B are opened and a discrete amount of resin components A and B are let out into mixer vessel 6–17. Enough material is mixed for any one time use related to the pot life of the mixed composition. Strands of fiber are drawn from Reels 6–10 and 6–11, the reels turning on axle 6–4, and the strands of fibers are drawn together in collection port 6–20 and over free roll guide 6–3 or under free roll guide 6–3 as is shown in the FIGURE 15. The strands 6–7–A&B as collected in collection port 6–20 when pulled over guide roll edge 6–15 and under free roll guide 6–3 and over guide roll edge 6–16 are impregnated and saturated with the composition comprised of polymeric resins A and B. In this condition, impregnated strands 6–7–A&B are laid on a surface that is to be bonded and joined together or, in fact for any other useful purpose to which the invention may be used. Mixer vessel 6–17 may be lined with a disposable liner as disclosed in my application Serial No. 340,642, filed January 16, 1953, now Patent No. 2,951,006.

The device of FIGURES 14 and 15 may be made as a disposable unit or it may be made with a long life frame holder of metal and the containers and reels being inserted as used up. With the use of disposable liners the mixing vessel 6–17 can also be a long life part of the device or apparatus of the invention.

Reduced to its elements of concept the invention provides means for bonding e.g., an upper porous structural building unit to a lower porous structural building unit or member comprising two separate spaced apart long flexible cords, or stranded members, or rovings, or in fact any adaptable fibrous or metallic or combination of any of these in compatible combination, one of said cords or strands being coated and/or permeated and impregnated with a polymerizable polymeric resin composition and the other cord or stranded member coated and/or permeated and impregnated with a catalyst or setting agent or other co-polymerizable material said cords or stranded members having long portions in contact with each other resting on top of said lower porous structural building unit whereby upon the placement of said upper porous structural building unit on said cords or stranded members the resulting pressure of the upper mass upon the lower mass compresses the cords or stranded members and setting of the polymeric resins composition takes place, some of the polymeric resin composition entering into the pores and the interstices of said porous structural building unit and in setting in this position and condition, securely bonds and joins the said building units together. The joinery this invention provides has been tested in shear to at least 2,000 p.s.i. The joinery of the invention is positive, quick in action or slow in action in the setting of the polymeric resin compositions as is designed within the knowledge of the resin art. Until the two strands or cords are joined together on the e.g., wall block units, long pot life can be had in the unjoined polymeric materials, but as soon as the two are placed in contact in the place of use, setting and curing under ambient means or other known means takes place.

By discretely compounding the amount of fibers used in relation to the viscosity of the resin compositions, the amount of pick-up of bonding resinous materials is substantially uniform so that the total composition of the joinery results in a structural entity of discrete depth, thickness and strength features.

Referring now to FIGURE 16, the device comprises a replaceable can-top to be used on standard tin can or other material type vessels. Materials coming to the place of use in standard packaging are made useable as components of the invention by removing the standard can-top and placing in its place, the device of FIGURE 16. Essentially this consists of a can-top having two ports or openings through which fibers or stranded materials or tapes may be pulled through a guide means, e.g., a bent wire guide fastened to the under side of the can-top.

Lid can top 8–4 has the two ports 8–2 and 8–1 and on the under side has guide 8–3 attached to the lid can-top. Strands or cords or tapes 8–77 are pulled from reel units and in use are pulled through polymeric resin composition adhesive used to bond the porous structural members together. On completion of any one use the device is removed from the container of resin composition and its original closure placed on it so that a sealed condition is had until the next use.

In FIGURE 17 is shown a sectional view of a vessel having a dispensing means showing material being applied to masonry wall. Vessel 9–10 may be of material suited to the materials it contains, e.g., metal, plastic or fiberboard lined with plastic, or any other suitable material. The vessel 9–10 is fitted with a reel unit hole inlet and outlet at 9–1 and 9–2 through which a mixer tube 9–3 is inserted. This mixer tube comprises a flexible or rigid pipe-like element having ports into it to admit the polymeric resin composition packaged in the vessel. On its upper ends above the level of the liquid composition in the can or vessel 9–10 it has one or more ports to allow for the release of air entrained into the tube as fibers 9–7 are pulled from reel-unit 9–11 into the tube 9–3 for the purpose of coating it and impregnating it with the resinous composition fluid in the vessel. Tube 9–3 has an extended portion which may be grasped by a mechanic so that he may direct the placement of the impregnated fibers onto a masonry unit or other surface that is being joined by the application of the materials. By fastening one end of fibers 9–7 to the outermost point on a wall comprised of masonry units 10, and by pulling the vessel along the wall or by any other means of moving it along the wall above the masonry units 10, the joinery materials of the impregnated fibers and resin composition are quickly and easily and accurately placed on the surfaces to be joined by the means of this invention. The joinery 9–7 may be used horizontally or vertically as is shown in the FIGURE 17. Two complementing units or vessels like 9–10 can be used in parallel or in tandem or one above the other to make use of a two or more component system of reinforcing materials.

Figure 18:
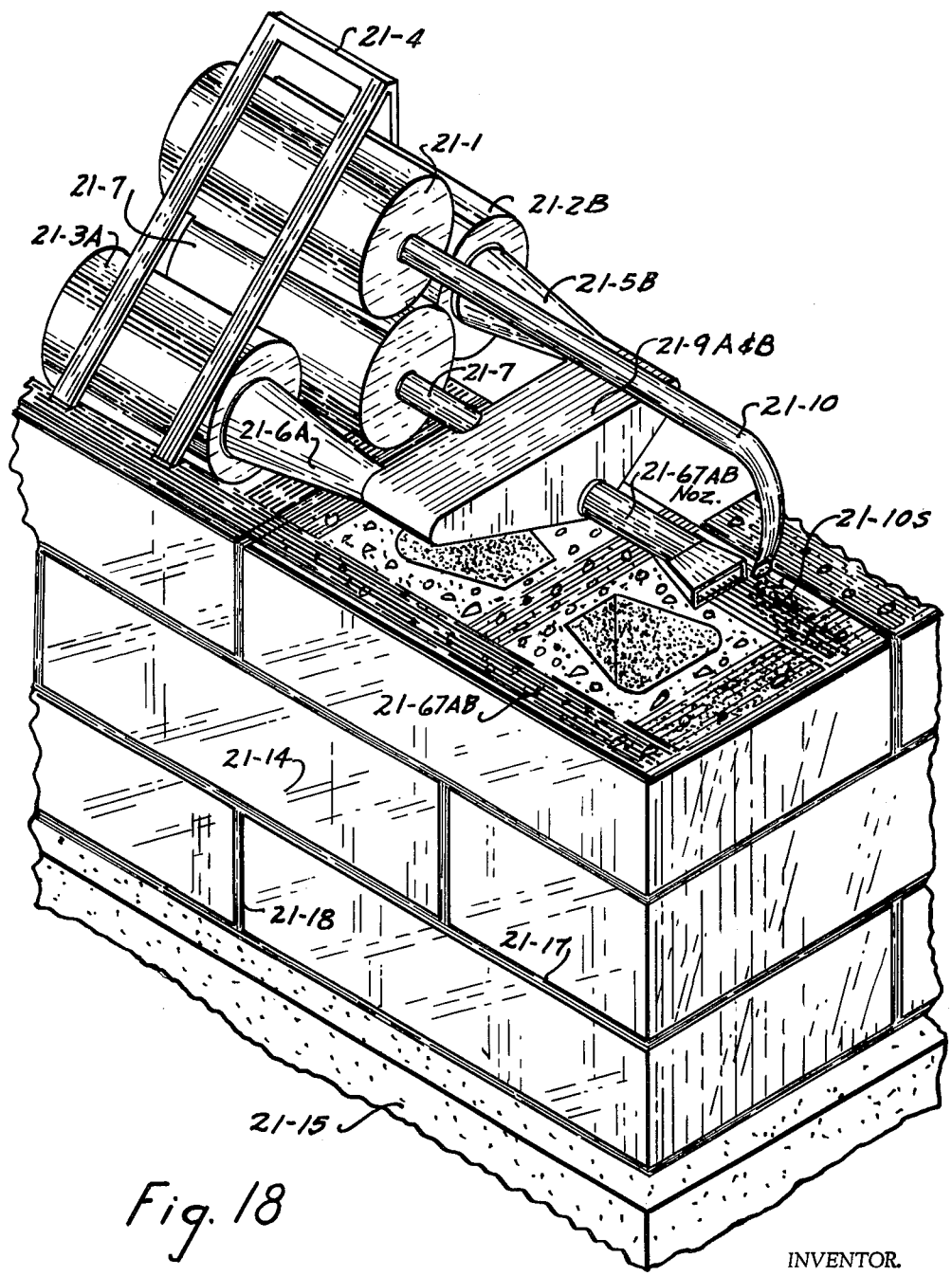
FIGURE 18 is an isometric view of another embodiment of the invention.

In FIGURE 18, I show another combination of features for making the invention. Joinery 21–67AB can be made by the apparatus and method disclosed having a thickness of small thickness, e.g., 1/32″ to 1/16″ thickness. When concrete masonry blocks are manufactured such a tolerance is hard to come by because of the nature of the concrete mix designs used and because the equipment wears resulting in mold wear tolerances greater than the desired minimums. It has been found that grinding the cured concrete blocks provides a planar surface unit adapted to close joinery and such a method is patented in my Patent No. 2,805,448. In the case of joinery utilizing common yard stock blocks without the benefit of grinding, the device of FIGURE 18 provides a means in the use of a filler, for example, sand particles of discrete screen size, e.g., 30 mesh or 60 mesh silica fines, and advantageously of a graded consistency so that large particles will not be admitted or placed into the joinery layer. By placing sand 21–10S from tube 21–10 poured from can or container 21–1 either before the impregnated reinforcement 21–67AB is placed on the wall unit 21–14 or after it is placed on the said unit, it is possible to grade to a thickness providing compensating materials to level place the following courses. Enough sand is placed with the polymeric resin composition glass fiber joinery to body-up the joinery to a thickness desired. By combining discrete amounts of polymeric-resin-composition-glass fiber-strands with discrete amounts of sand a joint thickness can be provided in a uniform manner as the device is pulled along the wall or carried along the wall in its use in making joinery.

Such a joint and joinery can be of a load-bearing nature and of substantial thickness as shown in the parent application.

The containers 21–3A and 21–2B are placed in a holder frame 21–4 with a fiber container, e.g., a reel of glass fiber rovings or strands or tapes, or tape-like construction 21–7 placed inbetween the containers 21–3A and 21–2B. On top of this container 21–1 having a filler material, e.g., sand, ground marble, onyx chips, ground mineral, calcium carbonate, calcium sulfate, aluminum particles and fines, stainless steel particles and fines, pigments, silica fines from dust (about 1200 mesh to e.g., 30 mesh) and sized particles of mesh sized colored aggregates as e.g., 0 and 00 mesh sized ground mineral fines, clays, bentonite clays, silt, sand washer fines, volcanic ash and fines, cinders, and in general any inert or specific function material suited to the job and construction at hand.

The polymeric resin composition A is fed through tube when mix is desired i.e., through tube 21–6A into mixing chamber 21–9A&B as is the complementary portion of the polymeric resin composition B fed through tube 21–5B into mixing chamber 21–9A&B. Fibers, e.g., glass fiber rovings 21–7 are fed into mixing chamber 21–9A&B and on being impregnated by the mixture of resin components A and B, the glass fiber rovings are drawn out through nozzle 21–67ABnoz and disposed on the surface of the wall unit 21-14. The sand or other mineral or filler as above explained, if used in that particular embodiment then being made, is combined as shown above.

The polymerizable resin compositions useful in this invention include unsaturated polyester resins of both the rigid and the flexible type, and any discrete combination of flexible and rigid polyester resins known in the art and adapted to this invention. Chlorinated polyester resins such as Hetron Resins as made by Hooker Chemical Company, North Tonawanda, New York, having flame retardant properties, are very useful resin systems. Dow Chemical Company epoxy resins as D.E.N. 438 and D.E.R. 332 blended together provide improved heat distortion temperatures in such systems. Dow epoxy novolac resin, D.E.N. 438 combines in one molecule the excellent thermal stability of the phenolic structures with the reactivity and exceptional versatility of the epoxides and includes a high reactivity toward all known epoxy curing agents and catalysts. Because of the average epoxide functionality of D.E.N. 438 is greater than three, tightly cross-linked structures are readily formed, giving cured masses which exhibit higher heat distortion temperature, better chemical resistance, and better adhesion than do bisphenol-based epoxies of less than two epoxide functionality. This is illustrative and not limiting disclosure.

As elsewhere disclosed herein epoxy-polysulfide rubber resins are useful resin systems and the following as Thiokol LP-3/epoxy adhesive formulations are representative systems found useful:

products adapted for use in this invention. When the fluid "Versamids" are blended with liquid epoxy resins, a chemical reaction occurs between the amino groups of the polyamides and the epoxy groups of the epoxy resins, resulting in the formation of a cross-linked or three-dimensional polymer. The resin combinations are "two-package" systems for which the present invention is ideally suited. Blending must occur shortly before use since the resins begin to react as soon as they are combined. At ambient temperature of 75° F. the following are typical pot life and exotherm figures:

| Composition | Ratio | Size of batch, gal. | Usual pot life, min. | Tepm. at gel time (° F.) | Max. temp. reached (° F.) |
|---|---|---|---|---|---|
| "Versamid" 125/"Bakelite" ERL 2795 | 40:60 | ½ | 60 | 185 | 355 |
| "Versamid" 125/"Ciba Araldite" 502 | 30:70 | ½ | 50 | 175 | 350 |
| "Versamid" 125/Shell "Epon" 815 | 35:65 | ½ | 55 | 195 | 400 |
| "Versamid" 115/"Bakelite" ERL 2795 | 50:50 | ½ | 110 | 140 | 140 |

These systems of polymerizable resins have relatively low shrinkage and are useful in features of the invention desiring this property. As shown in my copending applications other resin systems, e.g., polyurethane resins, phenolic resins, other amino resins, etc., are useful alone or in compatible combination as systems of resin structure known in the art.

Figure 19:
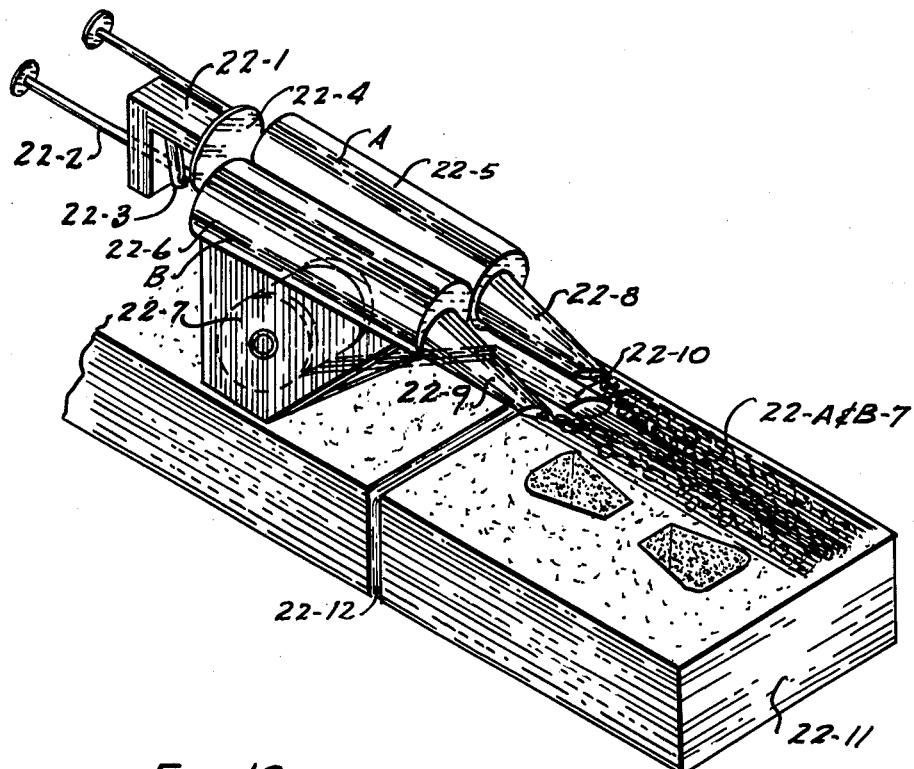
FIGURE 19 is an isometric view of a gun type means of the invention.

Referring now to FIGURE 19, an embodiment of the invention is shown comprising a dual container pressure gun dispenser with a reel-unit attached thereto particularly adapted to resin systems as those just described above. This dual container pressure gun means, while not so shown, can be made having an air pressure means or air-hydraulic or straight hydraulic or other power dispensed type of pressure means for dispensing the contents of the two containers to mix them together on the fibers as the fibers are pulled from the reel-unit attached to the said containers of A and B resin components. Element 22-1

| Formulation No | T-160a | T-161a | T-162a | T-163 | T-164 | T-165 |
|---|---|---|---|---|---|---|
| Part A, parts by weight: | | | | | | |
| Thiokol LP-3 | 100 | 100 | 100 | 100 | 100 | 100 |
| Mortar white silica HDS-100 | 80 | | | | | 80 |
| Whiting or silica flour (200 mesh) | | 278 | 291 | 278 | 291 | |
| DMP-10 | | 10 | 10 | | | 10 |
| DMP-30 | 20 | 10 | 10 | 20 | 20 | 10 |
| Toluene | | 5 | 48 | 5 | 48 | |
| Part B, parts by weight: | | | | | | |
| Epoxy Resin [1] | 200 | 200 | 200 | 200 | 200 | 200 |
| Whiting or silica flour (200 mesh) | | 203 | 190 | 203 | 190 | |
| Toluene | (2) | | 17 | | 17 | |
| Mixing ratio, parts by weight: A/B | 100/100 | 100/100 | (2) | 100/100 | (2) | 100/100 |
| Weight per gallon, lbs | 10.6 | 13.4 | 12.8 | 13.4 | 12.8 | 10.6 |
| Working properties at 80° F.: | | | | | | |
| Brushing life (unthinned), hrs | *10 | 1 | 1 | *10 | *10 | 1 |
| Brushing life (thinned with solvent),[3] hrs | 1 | 4-5 | 4-5 | 1 | 1 | 4-5 |
| Set time, hrs | *45 | 2-3 | 2-3 | *45 | *45 | 2-3 |
| Tack-free time, hrs | 5 | 4-6 | 4-6 | 5 | 5 | 4-6 |
| Cure time, hrs | 7 | 12 | 12 | 7 | 7 | 12 |

*Minutes.
[1] Epoxy Resin: epoxide equivalent, 175-210; mol. wt., 350-400; viscosity, 5,000-16,000 cps. at 25° C. Should not contain reactive diluents such as diglycidyl ether.
[2] T-162a and T-164 are compounded to be mixed in equal parts by volume, 100 p.b.v. Part A with 100 p.b.v. Part B.
[3] Thinned 20%, by volume, with toluene.

A typical epoxy-polyamide formulation having about 2750 p.s.i. shear strength on cold-roll steel at room temperature is as follows:

```
                                              Parts by
                                              weight
Polyamide (amine value 210-230) _____ 50
Epoxy resin—fluid type _____ 50
Tabular alumina _____ 20
```

The amino-containing polyamide resins of the fluid series "Versamid" 115 and "Versamid" 125 when blended with liquid epoxy resins harden into tough thermoset is a handle connected to elements 22-5 and 22-6 through connecting means 22-4, which is operated by pressing on lever 22-3, which drives forward element 22-2 causing pressure on the contents of the said containers 22-5 and 22-6. Polymeric resin composition A, e.g., an amino-containing polyamide resin of the fluid series "Versamid" 125 and polymeric resin composition B, e.g., an epoxy resin "Bakelite" ERL 2795 are released from the containers of the said gun dispenser in a ratio of e.g., 40:60 parts respectively. The ratio is determined by size of orifice related to the pressure of the device of element 22–1 and element 22–3 operating in connection with the device 22–4.

Fiber strands 22–7 are guided through tube 22–10 so that the materials leaving the dispensing tubes 22–8 and 22–9 are covered and impregnated with the polymeric resin composition components A and B and are united on the fibers and on the surface of the masonry block 22–11. Some of the composition resins enter into the pore structure of the said masonry block 22–11, and when the next block unit is placed upon the joinery material 22–A&B–7, i.e., that is the combination of the said components into its unitary joinery state, the joinery material 22–A&B–7 bonds and integrates the masonry blocks and joins them together in a very strong joint means. The pressure exerted by the weight of the subsequent masonry blocks placed over the first placed blocks, spreads out the materials of 22–A&B–7 to a discrete thickness depending upon the designed viscosity and joinery characteristics of the construction. As is obvious, this means utilizing the fibers and resin components as they are placed into end use, does not have any wasted materials, and the materials can be placed in any position on a vertical or horizontal surface or any other countered surface, or in fact in any place or useful condition of use.

Another feature that I have found to be of substantial use is that of providing the porous structural element with a sized and dressed edge on the faces being bonded together. This in conjunction with the sizing spools of FIGURES 8, 9 and 10 and/or any other sizing configuration of such a spool, provides a metering means whereby specific designed reinforcement can be placed into use. A thin joint and joinery means may be made so that substantially face to face bond is achieved when sized, planar faces of e.g., concrete blocks are placed together. A thick joint and joinery may be made providing a load bearing reinforcement in and of the joint and joinery and adapted to take a high order of dynamic loading. With sized and dressed porous structural elements as in my Patent No. 2,805,448 integrity of joinery and of total structure can be had as shown in this patent.

By combining the features of sized and dressed porous structural elements with grooves being cast into such elements at the time of manufacture or as later saw cut or grind cut into them, the sizing spools of this invention provide joinery and reinforcing means in one and the same joint and joinery means. As an xample, 9/16″ x 5/8″ V-shaped grooves were made into 8″ x 8″ x 16″ concrete blocks so that in a wall longitudinal reinforcement of the joint could be extended from block to block in these grooves. Polymeric resin composition glass fiber impregnated roving equal to the area of the groove in its cross section was drawn as from apparatus of FIGURE 7, (the other apparatus could have been used) and the joinery and joint made as disclosed with the added feature that the very substantial strong glass-fiber rod resulting from the polymeric resin composition glass-fiber reinforcing materials provided structural reinforcement of a small diameter equal to a much larger diameter steel rod and a water tight and sealed joint and joinery at the same time.

To secure integrity of structure in such constructions I have found that the selection of the resin systems used must be evaluated for its features of resistance to heat, moisture, destructive environments, organisms or chemicals. Also certain concretes, clay products or other porous structural elements used must be evaluated for compatibility so that alkalies, acids, or salts are considered and provided for if present. Because many of the resin systems are very new, full scale performance tests are most useful and in some cases mandatory before mass production uses are made of the polymeric resins, rubbers and elastomeric materials useful in this invention. By keeping in mind that the joinery of this invention is essentially comprised of three components, i.e., the material being adhered to called an adherend A interposed with the adhesive, or adhesive and reinforcing elements C, and an adherend B, the resulting composite structure is evaluated on the basis of the elastic constants of the e.g., adherend A and B in relation to the adhesive and reinforcing elements C. An evaluation of the possible discontinuity which could exist in the stresses and strains at the interface between the components should be made in relation to its structural integrity of structure evaluated on the basis of total composite structure.

I have found that consideration given to stress-strain discontinuities in my joinery caused by differences of materials properties involved may be affected or complicated by discontinuities resulting from shape of the adherends A and B. Also in total design of structure it must be recognised that the strength of a material is never a constant. All material is in a state of motion and movement by e.g., changes in heat of the environment and in changes in atmospheric pressure and as related to the kind of material, the method of its manufacture and the type of loadings and their orientation and source make for care in design and care in quality control of materials in being placed into their final state of use.

It is believed that the problems solved by this invention go directly to the heart of this problem and that integrity of structure is possible on a mass production basis and in on-site operations as in the construction industry by the means herein provided.

With this thought in mind, the following examples are given as illustrative of simple problems solved and are not to be considered as limiting the invention or any of its features in any way because the state of the art is in its infancy and in need of matured use of the products suggested, or disclosed by this application. The knowledge of the art of resins and the other products, e.g., concrete, glass fibers, epoxy resin, unsaturated polyester resins, catalysts of benzoyl peroxide with and without additives, polyamine resins as curing agents, polysulfide rubber resins as curing agents, and many more as disclosed in prior applications is found to be useful in the present invention and in most cases as being most advantageously used by the methods and apparatus of this invention.

The integrity of structure based upon its reliability in use requires that consideration be given to the structural characteristics of the porous structural elements provided as components of the composite structure and to the chemical nature of the cement, aggregates and sand used, or any other constituent used in making the precast porous elements useful in the invention.

The relationship in a chemical sense of the polymeric resin compositions, rubbers, elastomeric compositions or any combination of such compatible materials must be considered in the total design of product. The condition of the adhesive properties of the binding and bonding resin compositions at the time of use must be related to predetermined formulations determined for specific properties sought in the total product. In this regard the cleanliness of the porous structural material as well as the cleanliness of the processing apparatus and means, should be watched so that stray chemicals or dirt does not affect the final end product.

The features of the instant invention is directed to uniformity of the formulated materials and if basic chemical manufacturers and processors making up the packaged ready for use materials of the invention follow their normal quality control programs, a highly controlled end product may be had.

The pores and interstices of the porous structural material, e.g., concrete block, are considered as elements of the final end structure because of the amount of penetration and permeation of such pores and interstices is designed as a feature of the total end structure wherein the polymeric resin composition provides strengths in addition to the strengths of the porous structural material and by the combined structure of the fibrous reinforcement, polymeric resin composition and other included materials. If heat and pressure is a component of the formulations, it is important to process the total end product on a uniform basis, or provide features inducing control of quality. Other features required of specific formulations include moisture control, temperature control and humidity control. The multi-function features of the end product are structural engineering features in the sense that consideration must be given to the stress/strain characteristics of the structure made by the joinery. Residual stresses in certain materials are found to produce in an end product, if a joint is loaded so as to produce inelastic deformation of the adhesive polymeric resin composition, a condition wherein the joinery will not return completely to its initial dimensions. Such stresses are controllable by the plastic memory of polymeric resin compositions if adequate care in design and tests are adhered to in relation to a factor of safety meeting structural engineering standards of design. The ranges of elasticity or inelasticity of the binders and bonding agents useful in the invention are design problems which are solvable by the knowledge of the art of resin compounding and the art of structural engineering and materials engineering.

The following examples of specific formulations are illustrative only and are considered as not being limiting of the invention as the method and apparatus disclosed is found by tests to be useful in many other embodiments of the product of the invention.

EXAMPLE I

Utilizing the apparatus of FIGURE 1 a resin composition comprised of the following was prepared:

|  | Parts by weight |
|---|---|
| Unsaturated polyester resin—rigid type | 228.6 |
| Unsaturated polyester resin—flexible type | 22.4 |
| Mineral pigment color | 7.3 |
| Benzoyl peroxide paste—50% assay in tricresyl phosphate | 3.24 |
| Styrene monomer | 25.00 |
| Benzoyl peroxide 60% assay in methylethyl ketone | 1.86 |
| Cobalt naphthenate 6% | 0.86 |
| Silica flour—200 mesh high density | 25.00 |
| Silica granules—30 mesh sand | 25.00 |
| Glass fiber mat—2 oz. per sq. ft. strips 2" wide. | |

Using the above mixture resin composition of polymeric resins and setting agents, a series of tests conducted on structural composite assemblies using #4 reinforcing steel bar 415, bedded in precast grooves 417, in this case being 9/16" wide by 5/8" deep in the 8" face of a nominal 4" x 16"—2 cell concrete block 400 with 2-oz. glass fiber mat 407-8 sufficient to fill the groove space around the #4 bar; all capped with concrete cap block 1½" x 8" x 16" in multiples or cut to the desired test length showed the following results (all tests were conducted at 70° to 75° F.).

SAMPLE NO. 1192M1

| Determinations | "Lot Sample #4 Bar" |
|---|---|
| Yield load | 10,100 pounds (Control reference load). |
| Yield strength | 50,500 p.s.i. |
| Ultimate load | 14,900 pounds (Control reference load). |
| Ultimate strength | 74,500 p.s.i. |

SAMPLE 1192M2—TWO GROOVED BLOCKS—YARD STOCK CONCRETE BLOCKS

| Determinations | "Lot Sample #4 Bar" |
|---|---|
| Bond Test No. 1: | |
| Bond test length | 15.4 inches. |
| Pull-out load | 14,900 pounds (Failed the #4 bar). |

Conclusion: The 15.4" bond length exceeds the #4 bar strength, therefore, a shorter assembly was indicated and tested in Test No. 2.

SAMPLE 1192M3—ONE GROOVED BLOCK

| Determinations | "Lot Sample #4 Bar" |
|---|---|
| Bond Test No. 2: | |
| Bond test length | 7.6 inches. |
| Pull out load | 14,900 pounds (Failed the #4 bar). |

Conclusion: The 7.6" bond length exceeds the #4 bar strength, therefore, a shorter assembly was indicated and tested in Test No. 3.

SAMPLE 1192M4—CUT GROOVED BLOCK

| Determinations | "Lot Sample #4 Bar" |
|---|---|
| Bond Test No. 3: | |
| Bond test length | 3.5 inches. |
| Pull out load | 12,450 pounds (Exceeded yield load of #4 bar). |
| Calculated bond strength | 3,560 pounds per lineal inch. |

Conclusion: Test No. 3 indicated that the limit of the interface bond was reached, this was checked with a still shorter assembly in Test #4.

SAMPLE 1192M5—CUT GROOVED BLOCK

| Determinations | "Lot Sample #4 Bar" |
|---|---|
| Bond Test No. 4: | |
| Bond test length | 2.0 inches. |
| Pull out load | 7,000 pounds (Bond failed at less than #4 bar yield). |
| Calculated bond strength | 3,500 pounds per lineal inch. |

The glass fiber mat was pulled through the polymeric resin composition and placed saturated into the precast groove 417 (in this case being 9/16" x 5/8" groove) with a surplus of resin composition and its filler after which the #4 bar of steel reinforcing bar 415 was pressed into the groove 417 so that it lay in the groove and did not protrude. Additional resin composition from the mixture was applied and over this was placed the concrete cap block and then weight applied of about 10 lbs. p.s.f. The assembly was allowed to set over night at ambient temperatures and then tested in a standard testing machine meeting A.S.T.M. Standards. The above loadings were obtained. Uniform Building Code requires 24 lbs. per lineal inch bond strength of cement paste of the concrete to the #4 bar. The results were considered as amazing.

EXAMPLE II

Example I illustrates a system I call a one component system but the same resin composition may be used as a two component system by dividing the total of the resin compositions and the fillers and placing in one part the benzoyl peroxide catalyst system and in the other part the cobalt naphthenate 6% accelerator, so that each compartment of the device of FIGURE 3 has an equal portion. In this case two reels of glass fiber strands are utilized and each pulled through its respective bath of resin composition and then pulled onto the "Mixer cone" compressing one fiber against the other to commingle the catalyst provided resin with the accelerator provided resin composition and then drawing both strands out as a combination strand for use in making the joinery desired, or in fact for any other useful purpose.

EXAMPLE III

The apparatus of FIGURE 7 was used with a two component system as described in Example II and a glass fiber tape pulled through the device and impregnated with the two components of the resin system. On placing on the wall the tape formed the joinery between concrete blocks, the pressure of subsequent courses firmly squeezing the surplus resin into the pores and interstices of the blocks. A similar construction comprising a test unit of three blocks of concrete so bonded together with the center block raised from the base of the other two one inch higher, when placed in a compression press withstood 60,000 lbs. in compression and broke at 60,400 lbs. load with a resultant shear load of 2,000 p.s.i. with the failure partly in the concrete and partly in the plastic resin fiber glass joinery.

EXAMPLE IV

The apparatus of FIGURE 7 was utilized by filling two polyethylene bottles of the blow-molded type as used for household detergent and these two bottles were placed in a holding frame as in the FIGURE 7, the one bottle being filled with component Part A as below and the other with component Part B as below:

PART A:

| | Parts by weight |
|---|---|
| Liquid polysulfide polymer: Molecular weight—approx. 1,000 viscosity 700–1200 centipoises at 25° C. Essentially a difunctional mercaptan made from 98 mole percent of bis (2-chloroethyl) formal and 2 mole percent of trichloropropane, a cross-linking agent. Average structure: HS – $(C_2H_4-O-CH_2-O-C_2H_4-S-S)_6-C_2H_4-O-CH_2-O-C_2H_4-SH$ | 100 |
| Silica Flour (200 mesh) | 291 |
| DMP–10—Dimethylaminomethylphenol (Rhom & Haas Co.) | 10 |
| DMP–30—Tri - (dimethylaminomethyl)phenol (Rohm & Haas Co.) | 10 |
| Toluene—Aromatic hydrocarbon | 48 |

PART B:

| | |
|---|---|
| Epoxy resin: Epoxide equivalent, 175–210; Molecular weight, 350–400; Viscosity, 5,000–16,000 cps. at 25° C. (Should not contain reactive diluents such as diglycidyl ether.) | 200 |
| Silica Flour (200 mesh) | 190 |
| Toluene—Aromatic hydrocarbon | 17 |

Identical amounts by volume of 100 p.b.v. of Part A and 100 p.b.v. of Part B are placed in polyethylene bottles 501 and 502 of apparatus of FIGURE 7. If the viscosity for handling is not right the assisting features of adding toluene of up to 20% by volume can be followed. The apparatus of FIGURE 7 is used as previously described, turned over to emit polymeric resin composition to the glass fibers and reversed to stop operations. The above formulation at 80° F. has a set time of 2 to 3 hours and is tack free in 4 to 6 hours and cures in about 12 hours.

Another formulation of the type above given is as follows:

PART A:

| | Parts by weight |
|---|---|
| Liquid polysulfide polymer | 100 |
| Mortar white silica HDS–100 | 80 |
| DMP–30—tertiary amine catalyst (as above) | 20 |

PART B:

| | |
|---|---|
| Epoxy resin | 200 |

This may also be thinned by adding up to 20% toluene by volume. Parts A and B are mixed for use as in the apparatus of FIGURE 7. The polyethylene bottles are filled with 100 parts by weight of Part A in bottle 501 and 100 parts by weight of Part B in bottle 502. The orifice sizes of the metering orifices 510 and 511 are so sized that the exact amount of material is released from each bottle to impregnate the glass fibers or other fibers then being used on the reel 503.

The resins, rubbers and elastomeric materials and fillers and catalysts and setting agents disclosed in my prior applications and patents of record show a wide and useful assortment of materials many of which are additionally improved by the rapidly expanding art. In this application it is considered that any polymeric resin composition, rubber or synthetic rubber, or elastomeric composition, or any compatible combination of the same known in the art found adapted to the instant invention may be utilized in the practice of this invention. This applies to fibers and fillers also.

The embodiments and examples of the present application are in part substantially identical with those given in the above patent applications mentioned herein and a companion cases that cover related but distinct inventions, or as to disclosures made in prior applications but not claimed therein. It is to be understood by those versed in patent law and practice that this is because these practical articles, apparatus and methods embody several inventions, each or some of which can be used with or without the others, i.e., some of the inventions thus used together may be considered optional or can be replaced with alternatives.

The examples and alternatives given should not be regarded as exhaustive or limiting of the invention, but on the contrary, are given for the purposes of instructing others in the best manner of using and applying the invention and so far as to explain and illustrate the principles thereof that others will be enabled to use the invention in many modifications and various embodiments, each as may be best suited and adapted to the requirements of a particular use.

While certain preferred embodiments of this invention have been specifically disclosed, it is understood that the invention is not limited thereto, as many variations will be readily apparent to those skilled in the art and the invention is to be given its broadest possible interpretation within the terms of the following claims.

Having described the invention, what I claim as new is:

1. A structure comprised of a plurality of bonded-together porous structural units having reinforced plastic polymeric resin composition of substantially uniform high strength joinery means wherein said porous structural units are portions of said structure and exist aligned and in contact with each other through said elements of said joinery means being disposed between said porous structural units, said joinery means being bonded to said units and into the pores of said porous structural units, said structure being comprised of at least two porous structural units and the joined-together-combination of at least two long flexible cord reinforcements of high strength fiber, one of said cords including a polymerizable polymeric resin composition and the other cord including a copolymerizable polymeric resin composition containing a setting agent, the contact between the two cords causing polymerization and setting of the said polymerizable and copolymerizable resin compositions.

2. A structure as in claim 1 in which said long flexible cords are selected from the group of cord-like materials consisting of glass fiber roving, glass fiber tapes, glass fiber woven roving, glass fiber mats, glass fiber unidirectional stranded fibers, inorganic fibers, organic fibers, including metal wires in combination with glass fibers, said metal wires including stainless steel wires in combination with glass fibers, synthetic fibers in combination with glass fibers.

3. A structure as in claim 1 in which said polymerizable resin composition comprises polysulfide rubber composition and said copolymerizable resin composition comprises epoxy resin composition.

4. A structure as in claim 1 in which said two long flexible cord reinforcements comprise structural load bearing materials, said flexible cord reinforcements comprising glass fibers having at least pounds per square inch tensile strength in excess of the pounds per square inch compressive strength of said porous structural units and at least 3% extension capability with complete recovery memory before ultimate loading of said fibers.

5. A structure as in claim 1 in which in addition a discrete amount of substantially evenly spread layer of mineral particles in said polymerizable and copolymerizable resin compositions provides joinery thickening means.

6. A structure as in claim 1 in which said porous structural units have discrete grooves in at least one face thereof in which said jointed-together-reinforcements are disposed about steel reinforcement.

7. A structure as in claim 1 in which said polymerizable polymeric resin composition comprises an unsaturated polyester resin composition having a benzoyl peroxide catalyst and said copolymerizable polymeric resin composition comprises an unsaturated polyester resin composition having cobalt naphthenate 6% accelerator.

8. A structure as in claim 1 in which in addition, said glass fiber strands include a discrete amount of polyethylene terephthalate strands.

9. A structure as in claim 1 in which said polymerization and setting of said polymerizable polymeric resin composition and said copolymerizable resin composition causes internal stress, which internal stress captured in said porous structural material units, said joined-together-reinforcements, and said set resin compositions, provides substantial prestressed preload in said structure.

References Cited by the Examiner

UNITED STATES PATENTS

| | | | |
|---|---|---|---|
| 764,313 | 7/1904 | Stevens | 52—411 |
| 1,895,045 | 7/1933 | Moore | 94—1.5 |
| 2,052,229 | 8/1936 | Hyde | 52—308 |
| 2,428,325 | 9/1947 | Collins | 161—143 |
| 2,429,235 | 10/1947 | Mishelly et al. | 161—143 |
| 2,440,179 | 4/1948 | Mabli | 118—420 |
| 2,539,690 | 1/1951 | Boorn | 156—178 |
| 2,601,394 | 6/1952 | Hansen | 118—420 |
| 2,618,959 | 11/1952 | Watkins | 52—36 |
| 2,671,158 | 3/1954 | Rubenstein | 52—309 X |
| 2,740,459 | 4/1956 | Kilborn et al. | 156—178 |
| 2,752,275 | 6/1956 | Rashin et al. | 161—104 |
| 2,787,608 | 4/1957 | Gregory | 260—97.1 |
| 2,805,448 | 9/1957 | Rubenstein | 264—135 |
| 2,814,836 | 12/1957 | Russel | 264—274 |
| 2,850,890 | 10/1958 | Rubenstein | 52—309 X |
| 2,925,831 | 2/1960 | Welty et al. | 138—141 |
| 2,949,206 | 8/1960 | Figge | 156—390 |
| 2,951,001 | 8/1960 | Rubenstein | 161—91 |
| 2,950,576 | 9/1960 | Rubenstein | 52—223 |
| 2,951,001 | 9/1960 | Rubenstein | 161—91 |
| 2,951,006 | 9/1960 | Rubenstein | 52—309 X |
| 2,977,264 | 3/1961 | Shapero et al. | 161—162 |
| 2,981,308 | 4/1961 | Thompson | 156—351 |
| 3,013,916 | 12/1961 | Boiney et al. | 161—259 |

OTHER REFERENCES

Concrete—June 1949—pp. 12, 45.

Modern Plastics—September 1954—pp. 153–161 and 240–243.

FRANK L. ABBOTT, *Primary Examiner.*

HENRY C. SUTHERLAND, *Examiner.*